US008453014B2

(12) United States Patent
Kunii et al.

(10) Patent No.: US 8,453,014 B2
(45) Date of Patent: May 28, 2013

(54) METHOD AND COMPUTER FOR DESIGNING FAULT CAUSE ANALYSIS RULES IN ACCORDANCE WITH ACQUIRABLE MACHINE INFORMATION

(75) Inventors: Masashi Kunii, Yokohama (JP); Tomohiro Morimura, Kawasaki (JP); Takaki Kuroda, Machida (JP)

(73) Assignee: Hitachi, Ltd., Tokyo (JP)

( * ) Notice: Subject to any disclaimer, the term of this patent is extended or adjusted under 35 U.S.C. 154(b) by 837 days.

(21) Appl. No.: 12/664,310

(22) PCT Filed: Oct. 23, 2009

(86) PCT No.: PCT/JP2009/005598

§ 371 (c)(1), (2), (4) Date: Dec. 11, 2009

(87) PCT Pub. No.: WO2011/039826

PCT Pub. Date: Apr. 7, 2011

(65) Prior Publication Data

US 2011/0231715 A1 Sep. 22, 2011

(30) Foreign Application Priority Data

Sep. 30, 2009 (JP) ................................ 2009-225858

(51) Int. Cl.
*G06F 11/00* (2006.01)

(52) U.S. Cl.
USPC ................................ 714/37; 714/25; 714/39

(58) Field of Classification Search
USPC ........................................................ 714/37
See application file for complete search history.

(56) References Cited

U.S. PATENT DOCUMENTS 6,249,755 B1 6/2001 Yemini et al.

*Primary Examiner* — Scott Baderman
*Assistant Examiner* — Jigar Patel
(74) *Attorney, Agent, or Firm* — Foley & Lardner LLP

(57) ABSTRACT

A management system, which manages an information processing system by identifying a cause location based on previously defined analysis rule information, displays a status that is a condition of the analysis rule information but is not receivable, based on acquirable status information of the apparatuses making up the information processing system or information about statuses received in the past.

8 Claims, 27 Drawing Sheets

103-A1

ANALYSIS RESULT INFORMATION

| | | |
|---|---|---|
| A1-1 | ANALYSIS ID | A01 |
| A1-2 | ANALYSIS RESULT MESSAGE | FAULT IN CABLE BETWEEN Storage APPARATUS (Stg01) AND FC SWITCH (FcSw01) |
| A1-3 | RECEIVED EVENT | FcSw01-p01-LinkDown/R1-221 |
| A1-4 | UNRECEIVED EVENT | Stg01-p01-LinkDown/R1-211*2 |
| A1-5 | UNRECEIVABLE EVENT | - |
| A1-6 | CERTAINTY FACTOR | 50 |

ANALYSIS RESULT INFORMATION

| | | |
|---|---|---|
| A2-1 | ANALYSIS ID | A02 |
| A2-2 | ANALYSIS RESULT MESSAGE | FAULT IN CABLE BETWEEN Storage APPARATUS (Stg01) AND FC SWITCH (FcSw01) |
| A2-3 | RECEIVED EVENT | FcSw01-p01-LinkDown/R1-221 |
| A2-4 | UNRECEIVED EVENT | - |
| A2-5 | UNRECEIVABLE EVENT | Stg01-p01-LinkDown/R1-211*2 |
| A2-6 | CERTAINTY FACTOR | 50 |

ANALYSIS RESULT INFORMATION

| | | |
|---|---|---|
| A3-1 | ANALYSIS ID | A03 |
| A3-2 | ANALYSIS RESULT MESSAGE | FAULT IN LAN PORT (N01) OF Server (Srv05) |
| A3-3 | RECEIVED EVENT | Srv05-N01-Error/R32-221 |
| A3-4 | UNRECEIVED EVENT | - |
| A3-5 | UNRECEIVABLE EVENT | Srv05-NetworkClient1-Error/R32-211*1 |
| A3-6 | CERTAINTY FACTOR | 50 |

Fig. 12

105 ACQUIRABLE STATUS INFORMATION LIST

| APPARATUS TYPE (C5) | APPARATUS PART TYPE (C6) | STATUS (C7) | APPARATUS CONDITION (C8) |
|---|---|---|---|
| Storage | FcPort | Error | |
| Storage | FcPort | Normal | |
| | | | |
| Server | Network Client | Error | OS: XXX |
| Server | Network Client | Normal | OS: XXX |
| Server | LANPort | Error | |
| Server | LANPort | Unknown | |
| Server | LANPort | Normal | |
| | | | |
| FcSwitch | FcPort | Error | |
| FcSwitch | FcPort | LinkDown | PRODUCT NAME : SW- * |
| FcSwitch | FcPort | Normal | |
| | | | |

Fig. 13

106 STATUS INFORMATION RECEPTION HISTORY LIST

| APPARATUS TYPE (PRODUCT MODEL NUMBER) (C11) | APPARATUS PART TYPE (C12) | STATUS (C13) | NUMBER OF RECEPTIONS (C14) |
|---|---|---|---|
| Storage (ST-A1) | FcPort | LinkDown | 0 |
| FcSwitch (FS-Ayy) | FcPort | LinkDown | 0 |
| Storage (ST-A0) | FcPort | Error | 10 |
| FcSwitch (SW-A20) | FcPort | LinkDown | 0 |
| Server (D-100) | Network Client | Error | 5 |
| Server (D-100) | LANPort | Error | 10 |

Fig. 14

107 RELATED RULE INFORMATION

| UNRECEIVABLE EVENT TYPE (C15) | RELATED RULE ID (C16) |
|---|---|
| Storage - FcPort - LinkDown | R2 |
| | |
| | |

Fig. 15

108 STATUS CONVERSION LIST

| APPARATUS TYPE (C17) | APPARATUS PART TYPE (C18) | CONVERSION TARGET STATUS (C19) | CONVERTED STATUS (C20) |
|---|---|---|---|
| Storage | FcPort | LinkDown | Error |
| Server | Network Client | | |
| NO CORRESPONDING INFORMATION | NO CORRESPONDING INFORMATION | | |
| | | | |

EVENT MANAGEMENT INFORMATION

| | |
|---|---|
| EVENT ID | 0031 |
| EVENT DETECTION TIME | 2009-03-31-00-00-00-000 |
| OCCURRENCE SOURCE APPARATUS ID | Storage: Stg05 |
| OCCURRENCE SOURCE PART ID | FcPort: p01 |
| STATUS | Error |
| DETAILS | ... |

MANAGEMENT TARGET COMPOSITION INFORMATION

[Srv01: Server]
<Hardware>
CPU:...
NIC: N01(1Gb Ether)
HBA: HBA 1 having P01
Disk: SDA,SDB
OS: XXX,A08k-Patched
<Connection>
N01: connected to Srv05.N01
P01: connected to FCSw.P11
...
<Configuration>
Hostname: Srv01
N01: 192.168.0.1/255.255.255.0
FS Export: SDB as "share"
Disk: use Stg01.LUN1 as SDC
...
[Srv05: Server(PC500)]
<Hardware>
CPU:...
NIC: N01(1Gb Ether)
HBA: HBA 1 having P01
Disk: SDA,SDB
OS: XXX,A05-Patched
<Connection>
N01: connected to Srv01.N01
...
<Configuration>
Hostname: Srv05
N01: 192.168.0.2/255.255.255.0
FS Export: use Srv01. "share"as
NetworkDrive-D
...
[FCSw01 : FC Switch(SW-A20)]
<Hardware>
FC Port: P01,P05,P09,P11
...
<Connection>
P01: connected to Stg01.P01
P05: connected to Stg02.P02
P09: connected to Stg03.P03
P11: connected to Srv01.P01
...
<Configuration>
...

[FCSw02: FC Switch(FS-Ayy)]
<Hardware>
FC Port: P01,P05,P09,P11
...
<Connection>
...

[Stg01: Storage Subsystem(ST)]
<Hardware>
Ctr1-A having P01
HDD: HDD1,HDD2
...
<Connection>
P01: connected to FCSw01.P01
<Configuration>
LUN1: HDD1+HDD2 with RAID1
...
[Stg02: Storage Subsystem(Type-F)]
<Hardware>
Ctr1-A having P01,P02
HDD: HDD1,HDD2
...
<Connection>
P02: connected to FCSw01.P05
<Configuration>
LUN1: HDD1+HDD2 with RAID1
...
[Stg03: Storage Subsystem(FS-Bzz)]
<Hardware>
Ctr1-A having P01
HDD: HDD1,HDD2
...
<Connection>
P01: connected to FCSw01.P09
<Configuration>
LUN1: HDD1+HDD2 with RAID1
...

Fig. 28

METHOD AND COMPUTER FOR DESIGNING FAULT CAUSE ANALYSIS RULES IN ACCORDANCE WITH ACQUIRABLE MACHINE INFORMATION

TECHNICAL FIELD

The present invention relates to an information processing system including a computer, network apparatus and storage apparatus, and to a management system which manages this information processing system.

BACKGROUND ART

In recent years, systems which carryout information processing have become more complicated and larger in scale due to information processing apparatuses of a variety of different types (hereinafter, simply called "apparatuses") being connected via a network. In accordance with this, it has come about that a fault which occurs in a certain apparatus in a system has effects on various other apparatuses via the network. A production system is one method of root cause analysis for identifying the location and cause of a fault of this kind that has occurred.

A production system is a system whereby an inference engine, which is a processor that carries out cause analysis inference processing, deduces a solution by evaluation based on applying a predetermined rule of an if-then format to given factual data. An event representing fault details which is reported by an apparatus when a fault has occurred is taken as the factual data, and root cause analysis is performed by creating rules from the correlations between such events. One root cause analysis technology is event collection technology which analyzes faults and causes by using events representing fault details reported from an apparatus as described in Patent Literature 1.

CITATION LIST

Patent Literature

[PTL 1]

U.S. Pat. No. 6,249,755

SUMMARY OF INVENTION

Technical Problem

The rules of a production system which carries out root cause analysis automatically are designed on the basis of the knowledge possessed by rule designers in terms a fault propagation model which models how a fault is propagated to peripheral apparatuses in the event of a fault, and a data model which is information modeling the composition information of the apparatuses which are the targets of management. However, if the data model varies with each apparatus, then management becomes complicated.

Therefore, standardization is sought in the common portions of data models of respective apparatuses which have different platforms, such as the OS, vendor, or the like. Rules are designed on the basis of this standardized common data model (common model). However, portions which are different due to differences in the platform are not taken into account in the common model. Consequently, there exist cases where status information which is information indicating the state of apart of the apparatus cannot be acquired from a management target apparatus as inventory information which is apparatus composition information (case 1) and cases where the status information of a part of the apparatus that is acquired as inventory information does not accurately reflect the status information of the part of the apparatus (case 2).

Examples of status information are: "Normal" which indicates a normal status, "Error" which indicates an abnormal status, "Unknown" which indicates that the status is unknown, "LinkDown" which indicates a status where the connection with a peripheral apparatus has been cut off, and the like. The status information is not only information relating to the viability of the apparatus, but also includes the status relating to performance. In case 1 and case 2 described above, there are situations where the root cause analysis result which is actually output differs from the analysis result expected by the rule designer.

It is an object of the present invention to provide a management system which is able to present to a user an analysis result corresponding to status information that can be acquired respectively for each platform of management target apparatuses.

Solution to Problem

In order to resolve the aforementioned problems, the management system according to the present invention manages an information processing system by identifying a cause location on the basis of previously defined analysis rule information, and displays a status that is a condition of the analysis rule information but is not receivable, on the basis of acquirable status information of the apparatuses making up the information processing system or information about statuses received in the past.

Advantageous Effects of Invention

According to the present invention, it is possible to present to a user analysis results corresponding to status information that is acquirable for each respective platform of management target apparatuses.

BRIEF DESCRIPTION OF DRAWINGS

FIG. 10 shows an example of information relating to an analysis result generated when the analysis rule in FIG. 3 is applied to status information received from a monitoring target apparatus.

FIG. 11 shows an example of information relating to an analysis result generated when a rewriting processing is applied to information relating to the analysis result in FIG. 10 which is generated when the analysis rule in FIG. 3 is applied to status information received from a monitoring target apparatus.

FIG. 12 shows an example of information relating to an analysis result generated when the analysis rule in FIG. 8 is applied to status information received from a monitoring target apparatus.

FIG. 13 shows apparatus part status information which is acquirable for each apparatus, and which is necessary in judging whether it is possible to acquire the apparatus part status information stated in an analysis rule.

FIG. 14 shows reception history information of apparatus part status information stated in each analysis rule, which is necessary in judging whether it is possible to acquire status information which has not been received and which is included in the information relating to an analysis result.

FIG. 15 shows rule ID information of an analysis rule including status information judged not to be acquirable and information having a relation to this status information.

FIG. 16 shows identification information of processing carried out in accordance with status information judged to be not acquirable, and the like, when status information is judged to be not acquirable in the judgment using the information in FIG. 13 and FIG. 14.

FIG. 27 shows one example of event management information.

FIG. 28 shows one example of management target composition information.

DESCRIPTION OF EMBODIMENTS

Below, the present invention will be described. In the following description, the information according to the present invention is described in terms of "AAA table", "AAA list", "AAA DB" or "AAA queue", and the like, but this information may also be represented by other data structures than a table, list, DB or queue, or the like. Consequently, in order to indicate that there is no dependence on the data structure, there are cases where the "AAA table", "AAA list", "AAA DB" and "AAA queue", and the like, are called "AAA information".

Furthermore, when the contents of information held by the management server 1 are described, the terms "identification information", "identifier", "name", "ID" are used, but these terms are not limited to physical entities, such as apparatuses or components, but are also allocated in order to distinguish logical entities, and are therefore are mutually exchangeable with same.

Furthermore, in the description given below, processing is carried out using the "product model number" of an apparatus or part, but instead of a product model number, it is also possible to use information which is able to distinguish differences in the platform and which identifies that a plurality of apparatuses or parts have the same specifications, such as a product code.

In the following description, there are occasions where a "program" may be described as the subject of an action, but since prescribed processing is carried out by means of a program being executed by a processor while using a memory and an interface, then this may also be perceived as a description in which the processor is the subject. Furthermore, processing of which the program is the subject may also be processing that is performed by a computer, such as a management server, or an information processing apparatus. Furthermore, all or a portion of a program may be realized by dedicated hardware. Moreover, respective programs may be installed in respective computers by means of a program delivery server or memory media.

EXAMPLE 1

<1. Composition of Information Processing System>

Figure 1:
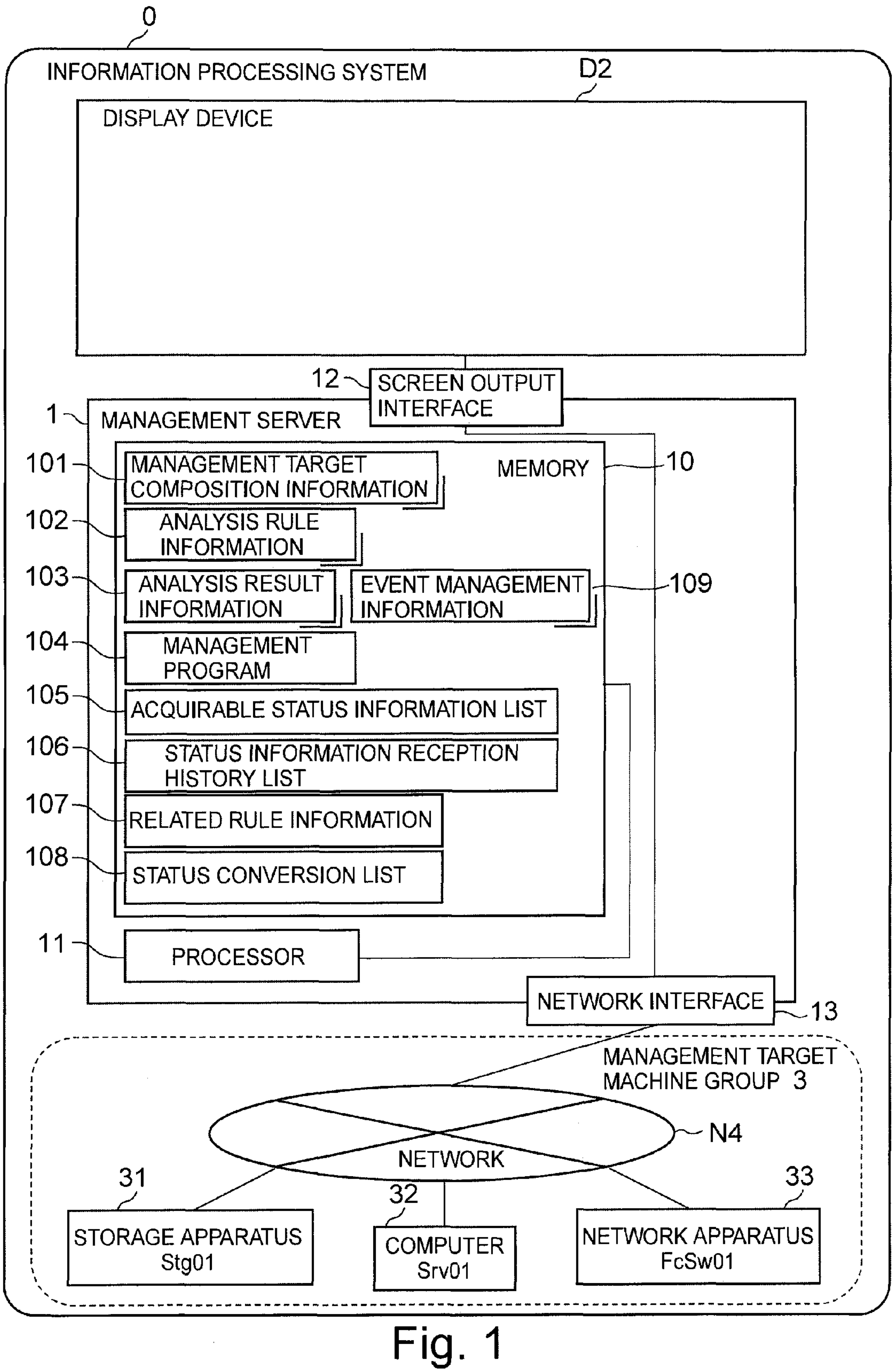
FIG. 1 is a schematic drawing of the general composition of an information processing system.

FIG. 1 is a schematic drawing showing one composition of an information processing system according to Example 1 of the present invention. The information processing system 0 comprises: a management target machine group 3 constituted by a storage apparatus 31, a computer 32 and a network apparatus 33, a processing server 1 which monitors and manages the management target machine group 3, and a display device D2 which displays screen output information generated by the management server 1.

The management server 1 comprises a memory 10 which is a region for storing information in the form of electronic data, a processor 11 which carries out processing for analyzing a fault that has occurred on a network using the electronic data present in the memory 10, a screen output interface 12 which outputs data for displaying on the display device D2, and a network interface 13 for sending and receiving electronic data to and from the management target machine group 3 via the management network N4. The memory 10 may be a semiconductor memory forming a main memory, or a magnetic disk device or external storage apparatus, forming a subsidiary memory.

The memory 10 stores the information or programs below.

Event management information 109 storing information relating to events received from the management target apparatuses. There may be a plurality of this information. FIG. 27 shows one example of event management information.

Management target composition information 101 including the composition of the management target apparatus and information about the physical or logical relationships with other apparatuses. The composition of the management target apparatus not only indicates what constituent parts the apparatus in question is made up of, but also includes the apparatus or part types, and the product model number. FIG. 28 shows one example of management target composition information 101.

Analysis rule information 102 which is used in order to carry out analysis processing by the processor 11.

Analysis result information 103 for storing the results of the processor 11 carrying out analysis processing by taking the analysis rule information 102 as an input.

A management program 104 which is a program for executing the procedure according to the present invention.

An acquirable status information list 105 which is a list of status information relating to apparatus parts which can be acquired as events from the information processing apparatuses.

An status information reception history list 106 which is the reception history of apparatus part status information that has been acquired as events from the management target machine group 3.

Related rule information 107 which relates status information that cannot be acquired with a rule ID of analysis rule information which includes, in the condition part, status information which can be acquired and which has an equivalent meaning to the status information that cannot be acquired.

A status conversion list 108 for deciding rule conversion processing which is executed in accordance with the result of evaluating the analysis rule information 102 and the analysis result information 103 using the acquirable status information list 105 and the status information reception history list 106.

As stated previously, the management server 1 is connected to a display device D2, but it may also be connected to another input/output apparatus. Possible examples of same are a display device, a keyboard and a pointer device, but apparatuses other than these may be used. Furthermore, as an alternative for an input/output apparatus, it is possible to use a serial interface or Ethernet interface as an input/output apparatus ("Ethernet" is a registered trademark), to connect a display computer linked to a display device D2 and keyboard and pointer device to this interface, and to substitute for input and display via an input apparatus by sending display information to the display computer and receiving input information from the display computer, whereby a display is provided and input is accepted on the display computer.

Below, a set of one or more computers which manages the management target apparatus group 3 and displays the display information according to the present invention is called a "management system". If the management server 1 displays the display information, then the management server 1 is a management system, and a combination of the management server and a display computer is also a management system. Furthermore, in order to increase the speed and reliability of management processing, it is also possible to achieve processing similar to that of the management server 1 by means of a plurality of computers, and in this case, the plurality of computers (also including a display computer if display is performed by a display computer) form a management system.

<1.1. Definitions of Terminology>

Next, the terminology used in the example of the present invention will be defined.

Information processing apparatus: An apparatus which sends or receives data via a network (a server computer, storage apparatus, printer, or the like); or an apparatus which relays the transmission and reception of data via the network (router, switch, or the like).

Monitoring target apparatus: An information processing apparatus which is the object of monitoring by the management server.

Certainty factor: A value representing the degree of certainty that a certain event will occur.

Topology: A term indicating the manner in which a plurality of apparatuses are connected together.

FC: A fiber channel.

FcSwitch: A switch to which a fiber channel is connected.

FcPort: A port to which a fiber channel is connected.

StorageFcPort: A port connecting a fiber channel of a storage apparatus.

FcSwitchPort: A port of a switch to which a fiber channel is connected.

Network Client: A client employed when using resources made available on a network.

Normal: Status-related information which indicates that a certain part of a certain apparatus is in a normal state.

Error: Status-related information which indicates that a certain part of a certain apparatus is in an abnormal state.

Unknown: Status-related information which indicates that the state of a certain part of a certain apparatus is unknown.

LinkDown: Status-related information which indicates that the connection from a certain part of a certain apparatus to a peripheral apparatus is cut off.

<1.2. Overview of Present Invention>

Next, an overview of the present invention is described. The management system according to the present invention analyzes the causes of a fault in the information processing system by taking a combination of occurrences (hereinafter, called "events") which have happened in information processing apparatuses that are the object of management, as a condition, and applying an analysis rule of an if-then format which deduces an estimated root causal event in respect of this condition of a combination of events. The management system saves information relating to received events, uses this saved information to evaluate the combination of events of the analysis rule and the certainty factor of the analysis result obtained by applying the analysis rule to an event that has actually occurred, and displays the analysis result and the certainty factor.

However, since the analysis rule information is created on the basis of a common model supported by a plurality of apparatus vendors provided that the apparatuses are of the same type, then it has been difficult to analyze the causes of faults in apparatuses having different specifications to the common model, as in the following examples, for instance.

If there is an apparatus which does not generate an event indicating a status stipulated in the common model.

If there is an apparatus which generates an event indicating a status that is different to the common model.

If there is an apparatus which generates an event which has the same status but a different meaning.

In the present invention, the management server carries out the following processing in such a manner that an administrator can readily carry out fault analysis.

First information which indicates receivable statuses for each one of previously investigated apparatus platforms, as information relating to the receivable events, and/or second information which indicates the statuses of events received in the past for each product number of an apparatus (or part), are stored, and when an analysis result is displayed, it is indicated that the calculation of the certainty factor includes an unreceivable event.

Since there is a possibility of receiving at a later time an event which has been considered to be unreceivable on the basis of the second information, it is also possible to display separately events which cannot be received due to the apparatus specifications on the basis of the first information, and events which have not yet been received on the basis of the second information. Since there is a possibility of receiving at a later time the latter type of event, then the administrator can readily judge whether there is spare margin for future improvement in the certainty factor of the prescribed analysis result.

An analysis rule including a status of a type which cannot be received on the basis of previous investigation is updated by a substitutable status, thereby improving the certainty factor. By this means, it becomes more possible to analyze fault causes in respect of apparatuses which deviate from the common model.

In the following description, expressions such as "event reception" and "event storage" performed by the management server 1 or a constituent part of the server are used, but since an event is an occurrence which happens in the management target machine group 3, then to provide a more accurate description, these are respectively "reception of information identifying an event" and "storage of information identifying an event in the event management information 109".

<2. Information Held by Information Processing System or Management Server>

The information held by the management server 1 is described below.

<2.0. Event Management Information>

FIG. 27 shows event management information 109. The event management information includes the information given below.

Event ID. Information which identifies the event management information.

Event detection time. Indicates the time at which an event is detected. Event detection occurs in both a monitoring target information processing apparatus and the management system, and the event detection time is set to a value based on a timer managed by the respective computer or apparatus.

Occurrence source apparatus ID. Stores an identifier of the apparatus where an event has occurred.

Occurrence source part ID. Stores an identifier of a part in an apparatus which is the reason for the occurrence of an event.

Status. Stores the status of the occurrence source part which has changed due to the occurrence of an event.

The event management information 109 may also include information other than this, and the values stated above may be changed to storage of direct values, by storing indirect information. One example of such a case, for instance, is one where instead of "status", a message that clearly identifies a particular status, such as "power failure in FC port", or the like, is input.

The event management information 109 is generated by processing by the management program 104 in accordance with the reception of information relating to events generated by the monitoring target information processing apparatuses in accordance with the detection of events and sent to the management system (hereinafter, called event reception information).

FIG. 28 is one example of management target composition information 101. FIG. 28 shows one example and does not limit the scope of the present application. In the example in FIG. 28, the following information is stored in the management target composition information in respective of each monitoring target information processing apparatus. The following items are not necessarily all required.

Type of monitoring target information processing apparatus (for example, storage system, switch apparatus, server apparatus, or the like), type of part making up the apparatus, and product model number of apparatus.

Information on part making up monitoring target information processing apparatus and the containment relationship between apparatus and part, or between part and part, and product model number if part has one. Incidentally, a part may also include a logical entity such as an OS. In this case, the information is stored in accordance with additional information such as the patch version which is used as the product model number of the OS.

If the part is used to perform network communications, the part forming the other end of the connection.

Configuration of monitoring target information processing apparatus.

It is supposed that the management target composition information 101 will be generated or updated by the processes stated below, but it may also be generated by another process.

The management program 104 generates or updates management target composition information 101 on the basis of composition information and configuration information for the respective apparatuses received from the monitoring target information processing apparatuses.

If the management program 104 is able to configure the monitoring target information processing apparatuses, the management program sets apparatus configuration information received via an input apparatus of the management server, in the corresponding apparatus, and also generates or updates the management target composition information 101.

<2.1. Analysis Rule Information>

Figure 2:
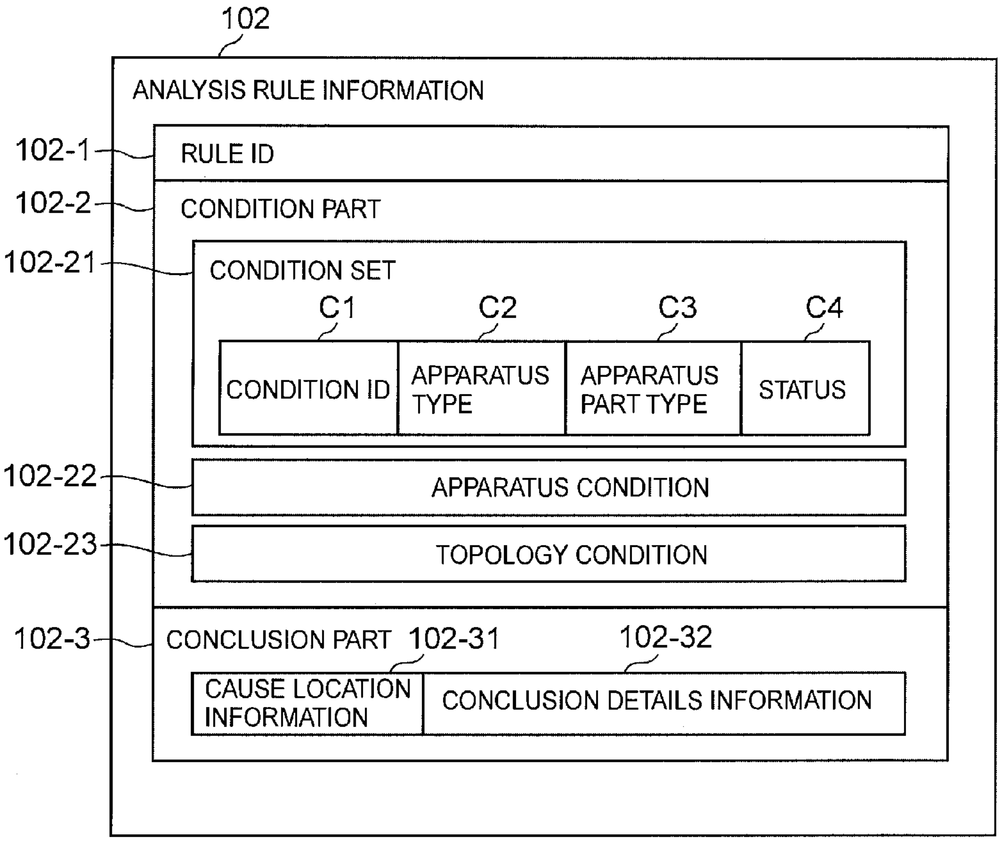
FIG. 2 shows types of information stored in an analysis rule used by a processor when carrying out fault analysis.

FIG. 2 is a diagram showing the type of information stored in the analysis rule information 102.

The analysis rule information 102 comprises a rule ID 102-1 which uniquely identifies the analysis rule, a condition part 102-2 and a conclusion part 102-3.

The condition 102-2 is made up of the following information.

A condition set 102-21 which is a combination of information (event information) relating to a status change which is expected to be received from a monitoring target apparatus, if the conclusion part is the cause.

An apparatus condition 102-22 indicating which kind of apparatus specified in the condition set 102-21 the present analysis rule is to be applied to.

A topology condition 102-23 indicating which kind of topology between monitoring target apparatuses specified in the condition set 102-21 the present analysis rule is to be applied to.

The conclusion part 102-3 comprises cause location information 102-31 which indicates the location of the cause of a fault as a conclusion relating to the conditions, and conclusion details information 103-32 which is detailed information about the cause of the fault.

The individual conditions which make up the condition set 102-21 comprise: a condition ID C1 for identifying a condition in the rule; an apparatus type C2 indicating the type of apparatus where the event has occurred, an apparatus part C3 indicating the type of a part of that apparatus; and a status C4 indicating the state of that apparatus part. Furthermore, the apparatus and topology conditions may be collected together in one information element as described above, or they may be specified as separate information elements: an apparatus condition and a topology condition. In order to explain the present invention, examples of general analysis rules are described below.

Figure 3:
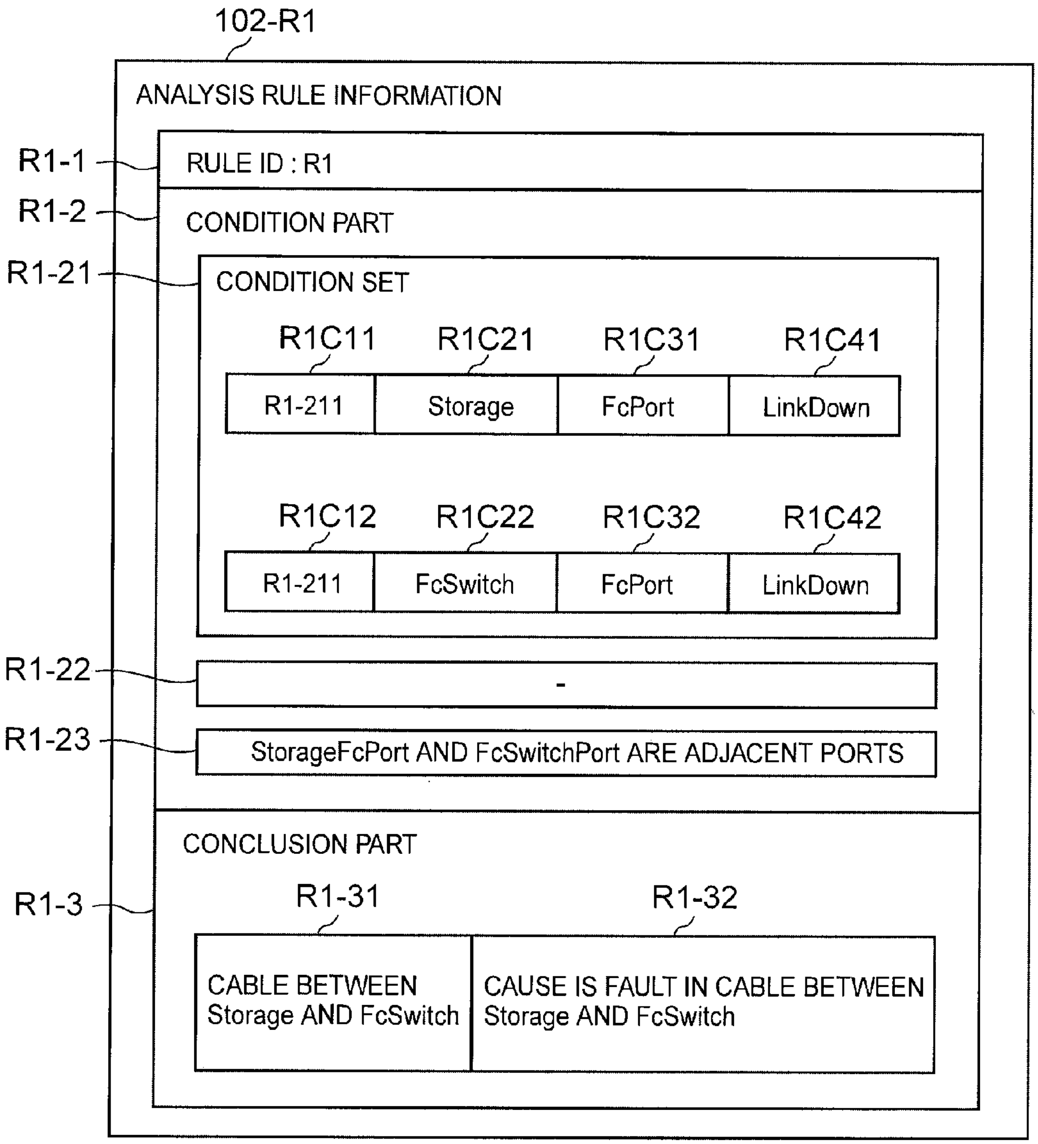
FIG. 3 shows an example of an analysis rule relating to a fault in a cable between a storage apparatus and an FC switch, in a connected state of an FC switch which is connected directly to an FC port of a storage apparatus.
Figure 4:
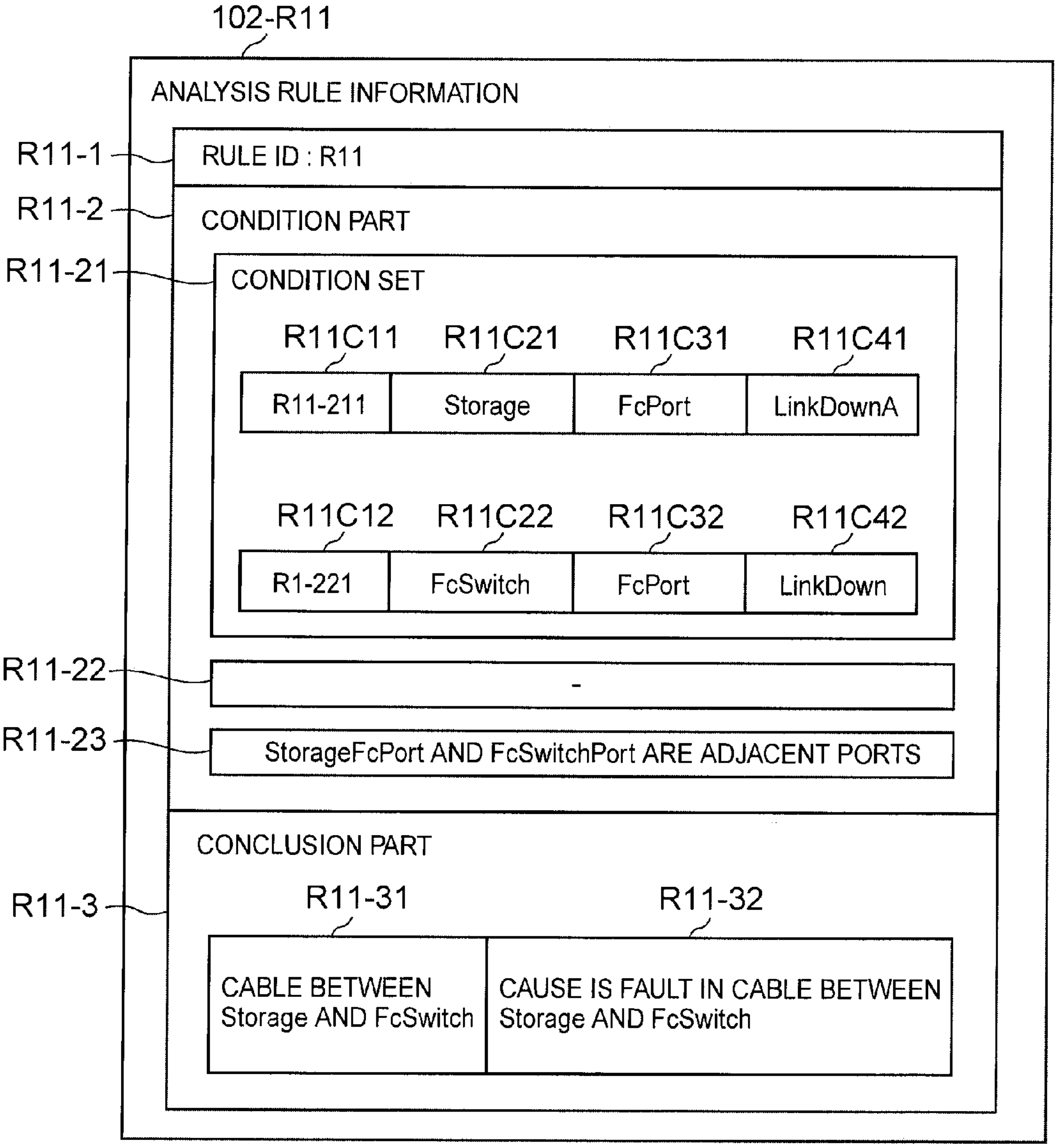
FIG. 4 shows an example of an analysis rule obtained by rewriting the apparatus part status information in the condition set of the analysis rule of the example in FIG. 3.
Figure 5:
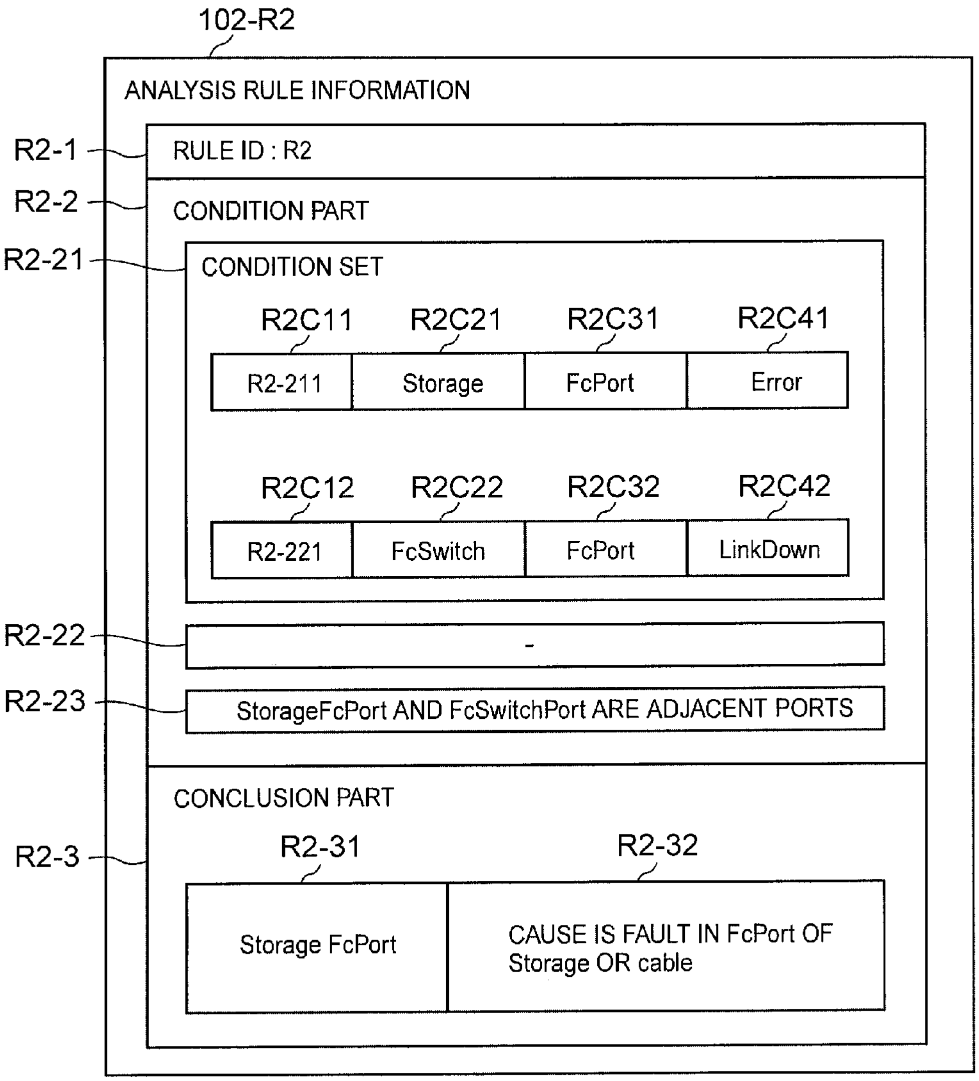
FIG. 5 shows an example of an analysis rule relating to a fault in an FC port or a cable of a storage apparatus and an FC switch, in a connected state of an FC switch which is connected directly to an FC port of a storage apparatus.

The analysis rule information 102-R1, 102-R11 and 102-R2 shown in FIG. 3, FIG. 4 and FIG. 5 are examples of analysis rules relating to a storage apparatus, and a FC switch which is adjacent to the storage apparatus. The entry "StorageFcPort and FcSwitchPort are adjacent ports" in the apparatus and topology condition R1-22 of the condition part R1-2 shown in FIG. 3 means that the FC port of the storage apparatus and the FC port of the FC switch are connected together directly without any other apparatus interposed therebetween.

The analysis rule information 102-R1 in FIG. 3 indicates an analysis rule in which the condition part states "the status of the FC port of the storage apparatus has changed to LinkDown" and "the status of the FC port of the FC switch has changed to LinkDown", and the conclusion part states "the cause is a cable fault between the storage apparatus and the FC switch".

The condition set R1-21 of the analysis rule information 102-R1 comprises the following two conditions. In the analysis rule information 102-R1, the entry "R1-211" in the condition ID R1C11, the entry "Storage" in the apparatus type R1C21, the entry "FcPort" in the apparatus part type R1C31 and the entry "LinkDown" in the status R1C41 mean that the condition ID is R1-211, and that a change in the status of the FcPort of the Storage to "LinkDown" is taken as a condition. Furthermore, the entry "R1-221" in the condition ID R1C12, the entry "FcSwitch" in the apparatus type R1C22, the entry "FcPort" in the apparatus part type R1C32 and the entry "LinkDown" in the status R1C42 mean that the condition ID is R1-221, and that a change in the status of the Port of the FcSwitch to "LinkDown" is taken as a condition.

Figure 6:
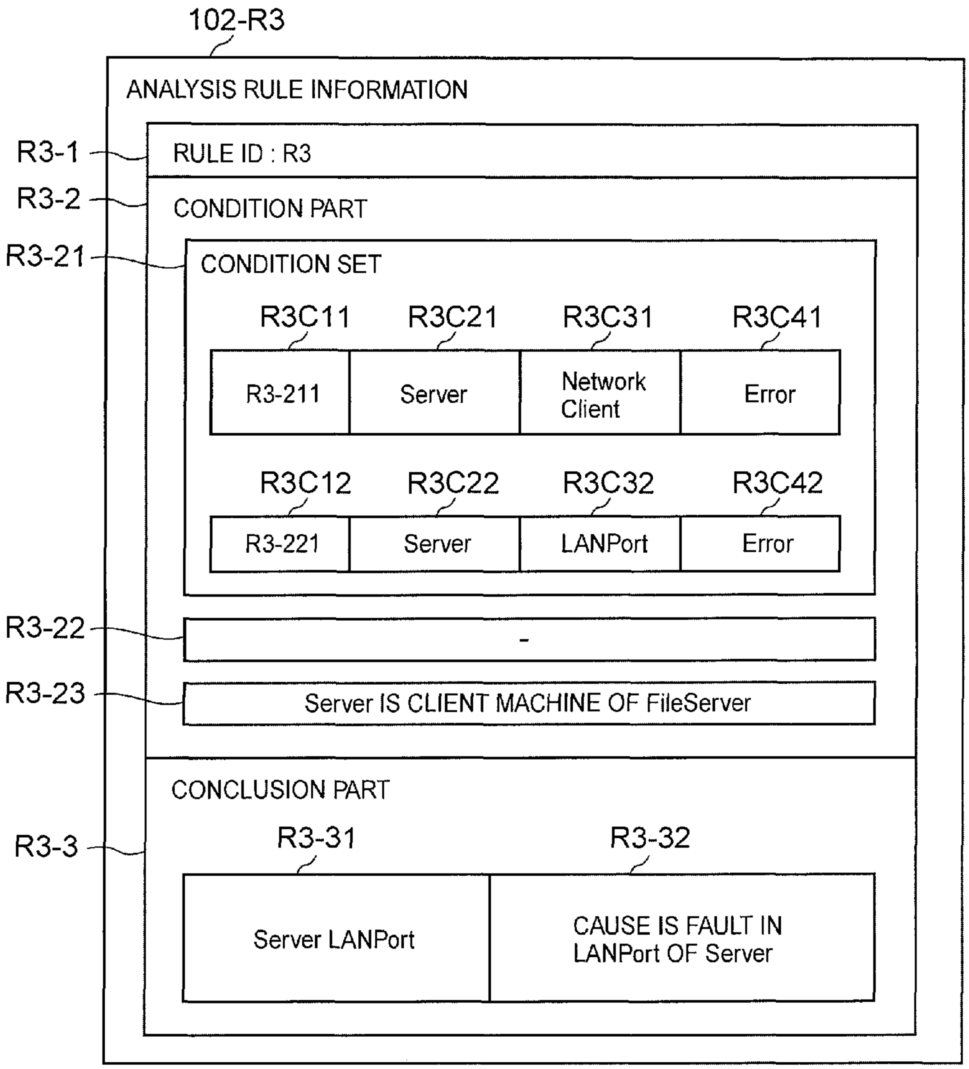
FIG. 6 shows an example of an analysis rule relating to a fault in a LAN port of a server in a connected state of a server which is a client machine of a file server.
Figure 7:
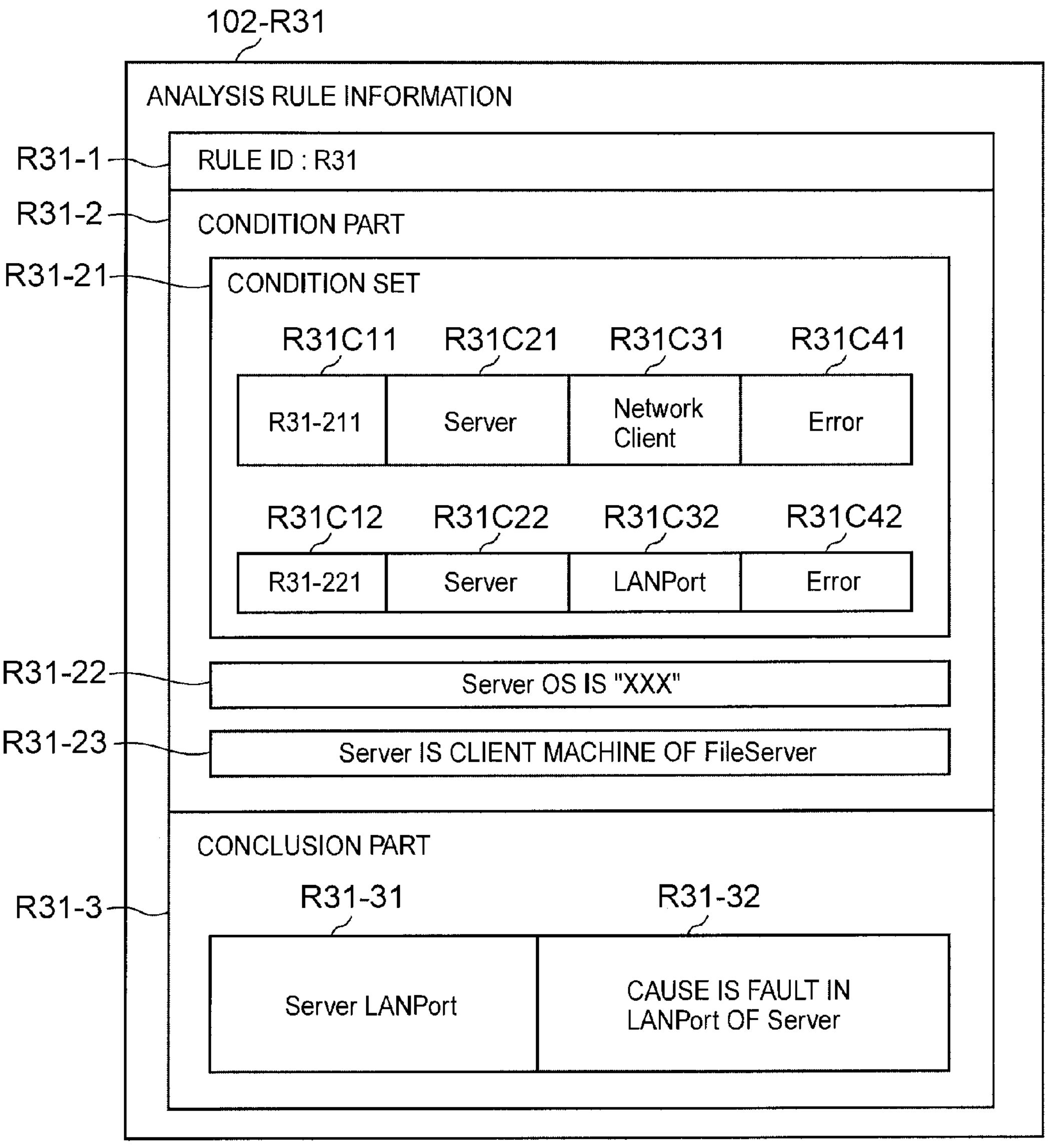
FIG. 7 shows an example of an analysis rule where the server OS is "XXX" in the analysis rule of the example shown in FIG. 6.
Figure 8:
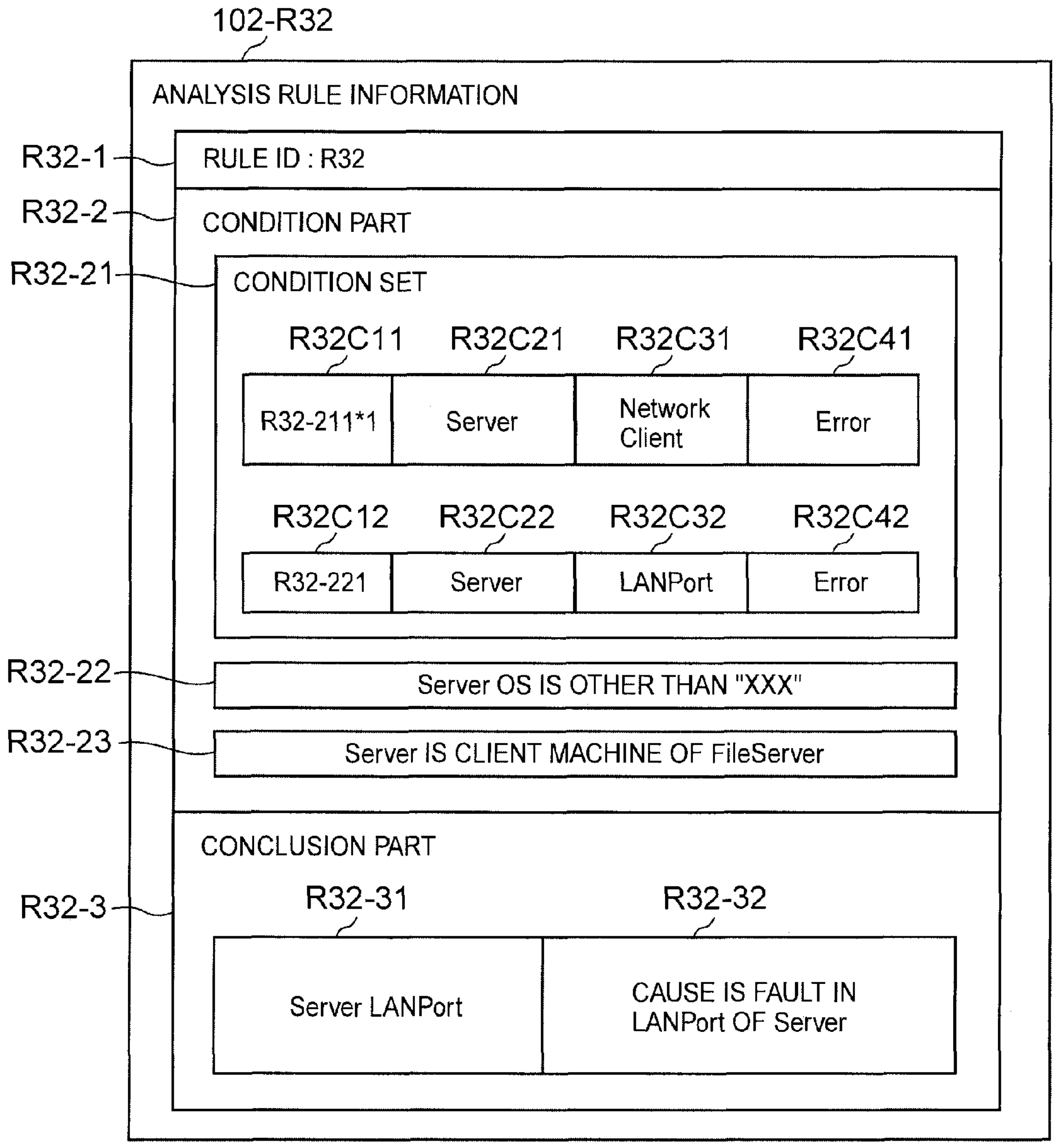
FIG. 8 shows an example of an analysis rule where the server OS is an OS other than "XXX" in the analysis rule of the example shown in FIG. 6.

The conclusion part R1-3 indicates that the cause location information R1-31 is "cable between Storage and FcSwitch" and the conclusion details information R1-32 is "the cause is a fault in the cable between the Storage and FcSwitch". The analysis rule information 102-R3, 102-R31 and 102-R32 shown in FIG. 6, FIG. 7 and FIG. 8 are examples of analysis rules relating to a server which uses a file system that has been made available to other computers on a network by a file server, as a network drive. The entry "the Server is a client machine of the File Server" in the topology condition of the condition part means that the server is one using the file system of a file server as a network drive.

The information shown in the analysis rule information in FIG. 4, FIG. 5, FIG. 6, FIG. 7 and FIG. 8 can be interpreted by a similar approach to that described in FIG. 3. The details are described in "3. Processing of management server and display".

The foregoing are examples of analysis rule information prepared in order to explain the processing according to the present example.

<2.3. Analysis Result Information>

Figure 9:
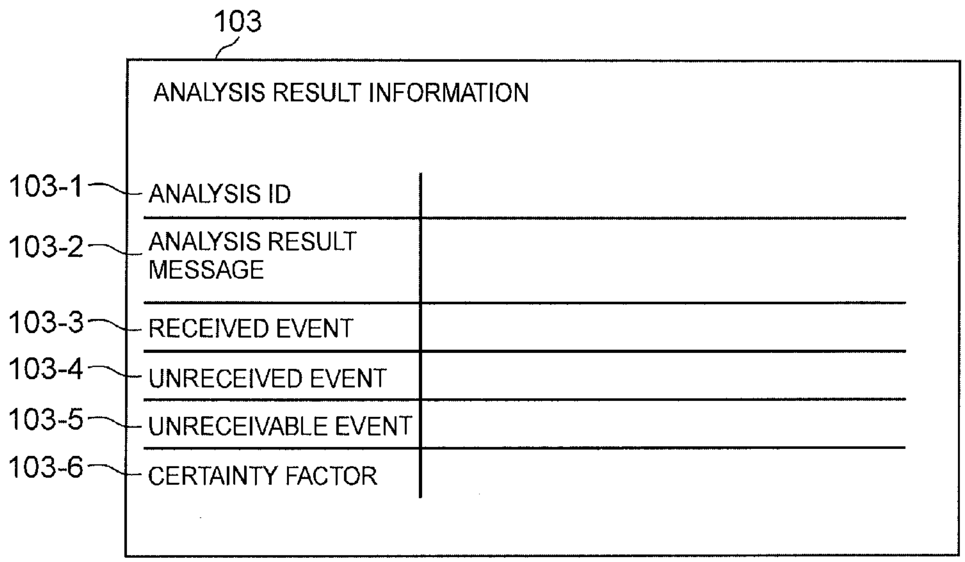
FIG. 9 shows the type of information stored in an analysis result generated when fault analysis has been carried out by a processor on the basis of an analysis rule.

FIG. 9 is a diagram showing the type of information stored in the analysis result information 103.

The analysis result information 103 is made up of the following information.

Analysis ID 103-1 storing identifier which uniquely identifies analysis result.

Analysis result message 103-2 which describes contents of analysis.

Received event 103-3 which holds event that is related to the analysis result and could already be received.

Unreceived event 103-4 which holds event that is related to the analysis result but could not yet be received.

Unreceivable event 103-5 which holds event that is related to the analysis result but cannot be received.

Certainty factor 103-6 which is a value evaluating the degree of certainty of the conclusion of the analysis result.

The received event 103-3, unreceived event 103-4 and unreceivable event 103-5 are expressed as events which represent a status change by a string comprising the identifier of the apparatus C2, the identifier of the apparatus part C3 and the status C4 in FIG. 2, linked together by the hyphen "-", followed by a forward slash "/", followed by a condition ID corresponding to the condition of the analysis rule information which is the source generating the event. A notation method other than that described above may be adopted, provided that makes it possible to identify the kind of event.

The analysis result information 103-A1 in FIG. 10 is analysis result information produced when the analysis rule information 102-R1 is applied to a topology where a storage apparatus having the identifier "Stg01" in FIG. 1 and the FC switch having the identifier "FcSw01" are disposed adjacently. The analysis ID A1-1 states "A01" and the analysis result message A1-2 states a message "Fault in cable between storage apparatus (Stg01) and FC switch (FcSw01)" for indicating that there is a fault in the cable between the storage apparatus having identifier "Stg01" and the FC switch having identifier "FcSw01".

The received event A1-3 states "FcSw01-p01-LinkDown/R1-221", which is an event meaning that the status of p01 which is an FcPort of the FcSwitch, "FcSw01", has changed to Link Down. This is generated on the basis of the apparatus R1C22 "FcSwitch", the apparatus part R1C32 "FcPort", the status R1C42 "LinkDown" and the condition ID R1C12 "R1-221", in the condition set R1-21 of the analysis rule information 102-R1.

The unreceived event A1-4 states "Stg0/-p01-LinkDown/R**1-221*2", which is an event meaning that the status of p01, which is an FcPort of the storage apparatus "Stg01", has changed to Link Down. This is generated on the basis of the apparatus R1C21 "Storage", the apparatus part R1C31 "FcPort", the status R1C41 "LinkDown" and the condition ID R1C11 "R1-211", in the condition set R1-21 of the analysis rule information 102-R1. Furthermore, "*2**" is appended as a symbol. Moreover, the certainty factor relating to this result is stated as 50%.

If "*1" is stated at the end of an event described in the unreceived event list 103-4 or the unreceivable event list 103-5, then this indicates that that event cannot be acquired from the monitoring target apparatus. The acquirable status information list 105 is used in this judgment.

Similarly, if "*2" is stated at the end of an event described in the unreceived event list 103-4 or the unreceivable event list 103-5, then this indicates that that event has not been acquired from a monitoring target apparatus having the same apparatus type, since a prescribed point in time. The status information reception history list 106 is used in this judgment.

FIG. 11 is a rewritten version of FIG. 10, and FIG. 12 is analysis result information output on the basis of the analysis rule information in FIG. 8. The information indicated in each analysis result information can be interpreted by the same approach as that described in FIG. 10. The details are described in "3. Processing of management server and display".

The foregoing are examples of analysis result information prepared in order to explain the processing according to the present example.

<2.4. Acquirable Status Information List>

FIG. 13 shows one example of data stored in the acquirable status information list 105. The acquirable status information list 105 is an information list created on the basis of the result of an investigation carried out previously in respect of information (events) relating to acquirable status changes in apparatus parts which differ according to the platform of each apparatus, such as the OS or vendor. The acquirable status information list 105 is used to judge whether the status C4 in the apparatus part type C3 of the apparatus type C2 of the respective conditions stated in the condition set 102-21 of the analysis rule information 102 is status information that can actually be acquired as an event from the monitoring target apparatus. The acquirable status information list 105 comprises an apparatus type C5, apparatus part C6, status C7 and apparatus condition C8; the apparatus type C2 of each condition described in the condition set 102-21 of the analysis rule information 102 corresponds to the apparatus type C5, the apparatus part type C3 corresponds to the apparatus part type C6, the status C4 corresponds to the status C7, and the apparatus condition 102-22 corresponds to the apparatus condition C8. FIG. 13 shows, by way of example, the acquirable statuses relating to the apparatus and apparatus parts included in the condition sets of the respective analysis rule information in FIG. 3, FIG. 4, FIG. 5, FIG. 6, FIG. 7 and FIG. 8. From the acquirable status information list 105 in FIG. 13, it can be seen that the statuses that can be acquired in respect of the FC port of a storage apparatus are "Error" and "Normal", the statuses that can be acquired in respect of a network client of the server computer having the OS "XXX" are "Error" and "Normal", the statuses that can be acquired in respect of a LAN port are "Error", "Unknown" and "Normal", and the statuses that can be acquired in respect of an FC port of an FC switch are "Error", "LinkDown" and "Normal". The information used to judge whether or not status information is acquirable does not have to be information relating to statuses that can be acquired, provided that the information can be used to judge whether or not the status can be acquired. For example, a list of status information that cannot be acquired may be used.

Furthermore, it is also possible to permit a partial match of the condition stated in the apparatus condition.

<2.5. Status Information Reception History List>

FIG. 14 shows one example of data stored in the status information reception history list 106. The status information reception history list 106 is history information relating to the extent to which it is possible actually to acquire the status C4 in the apparatus part type C3 of the apparatus type C2 of the respective conditions stated in the condition set 102-21 of the analysis rule information 102, as an event generated by the monitoring target apparatus. The status information reception history list 106 is used to judge whether an unreceived event 103-4 in the analysis result information 103 which is obtained by applying and evaluating the analysis rule information 102 to an event generated by the monitoring target apparatus is an event that can actually be acquired from the monitoring target apparatus as an event. The status information reception history list 106 comprises an apparatus type C11, an apparatus part type C12, a status C13 and a number of receptions C14. Values of the following kinds are entered in the respective columns.

Apparatus type C11: Contains the type and product model number of the apparatus indicated in the event.

Apparatus part type C12: Contains type and product model number of logical or physical part in the apparatus indicated in the event.

Status C13: Contains the status of the apparatus or part indicated in the event.

The number of receptions C14 indicates the number of times that an event received from a monitoring target apparatus has matched the apparatus C11, the apparatus part C12 and the status C13. FIG. 14 depicts the information included in the analysis rule information 102-R1, 102-R2, 102-R3 in FIG. 3, FIG. 5 and FIG. 6. From the number of receptions C14, it is possible to judge whether the unreceived event 103-4 in the analysis result information 103 is an event that cannot be received.

Desirably, this list records the number of receptions for the same product and for the same part product. This is because, provided that the product or part is the same, then the statuses which occur are also the same, and therefore it is possible further to reduce the events displayed as unreceivable events indicated by "*2", compared to a case where the number of receptions are recorded for each individual monitoring target apparatus. By reducing the unreceivable events, the administrator can readily wait until receiving further events in order to obtain an analysis result having a higher certainty factor.

Furthermore, the product model numbers do not necessarily have to be completely matching. For example, although the product model number may vary with slight change in the product specifications, provided that the product is functionally the same and the statuses it can assume are the same, then the number of receptions can be counted as if for the same product. In order to carry out an operation of this kind, it is possible previously to store a list of interchangeable product names, which can be used in counting the number of receptions. Alternatively, it is also possible to take account only of a predetermined portion of the product model number in the count.

<2.6. Related Rule Information>

FIG. 15 shows one example of data stored as related rule information 107. The related rule information 107 comprises an unreceivable event type C15 which indicates status information that cannot be acquired (event information that cannot be received) or a related rule ID C16 which indicates a rule ID of analysis rule information that includes, in the condition set, status information similar to the status information that cannot be acquired. The analysis rule information which includes similar status information in the condition set is analysis rule information which includes a condition set comprising the same apparatus and apparatus part as the analysis rule information that includes the status information that cannot be acquired, and in which it has been possible to acquire status information comprising the same apparatus and apparatus part as the apparatus and apparatus part of the status information that cannot be acquired. In FIG. 15, by way of example, "Storage-FcPort-LinkDown", which means that the status of the FC port of the storage apparatus is LinkDown, is displayed as unreceivable event type C15, and the rule ID R2 in the analysis rule information 102-R2, which includes a condition meaning that the status of the FC port of the storage apparatus is an error status, is displayed as apparatus/apparatus part/status information similar to the "Storage-FcPort-LinkDown" of the unreceivable event type (from the apparatus type R2C21 "Storage", the apparatus part type R2C31 "FcPort" and the status R2C41 "Error", it can be seen that the information includes a condition meaning that the status of the FC port of the storage apparatus is an error status.) The judgment of whether or not status information can be acquired is made by the management program 104 using the acquirable status information list 105 and the status information reception history list 106.

<2.7. Status Conversion List>

FIG. 16 shows one example of data stored as a status conversion list 108. The status conversion list 108 is an information list which relates a search result of a search with regard to whether the acquirable status information list 105 includes the status information C4 of the apparatus part C3 of a certain apparatus C2 which is included in the condition set 102-21 of the analysis rule information 102, with a status C19 which is a conversion target for status conversion processing carried out in accordance with the search result, and a converted status C20. FIG. 16 comprises the apparatus type C17, apparatus part type C18, status C19 forming conversion target of status conversion processing, and converted status C20. This information is created on the basis of an input by an administrator or another computer. More desirably, the conversion target status and converted status are input as values based on the common model and the product specifications of the monitoring target apparatus (or part).

To describe one example of processing using the status conversion list, if the acquirable status information list 105 in FIG. 13 is used in respect of the conditions included in the condition set R1-21 of the analysis rule information 102-R1 (the apparatus, apparatus part and status), then it is judged that there is no information matching the apparatus type R1C21 "Storage", the apparatus part type R1C31 "FcPort" and the status R1C41 "LinkDown". In this case, there is information matching the apparatus type R1C21 "Storage" and the apparatus part type R1C31 "FcPort" in the acquirable status information list 105 in FIG. 13, and therefore the status conversion list in FIG. 16 is searched on the basis of the matching information.

<3. Processing of Management Server and Display>

Next, an overview of the operation of the management program 104 in the management server 1 will be described with reference to the drawings.

Figure 17:
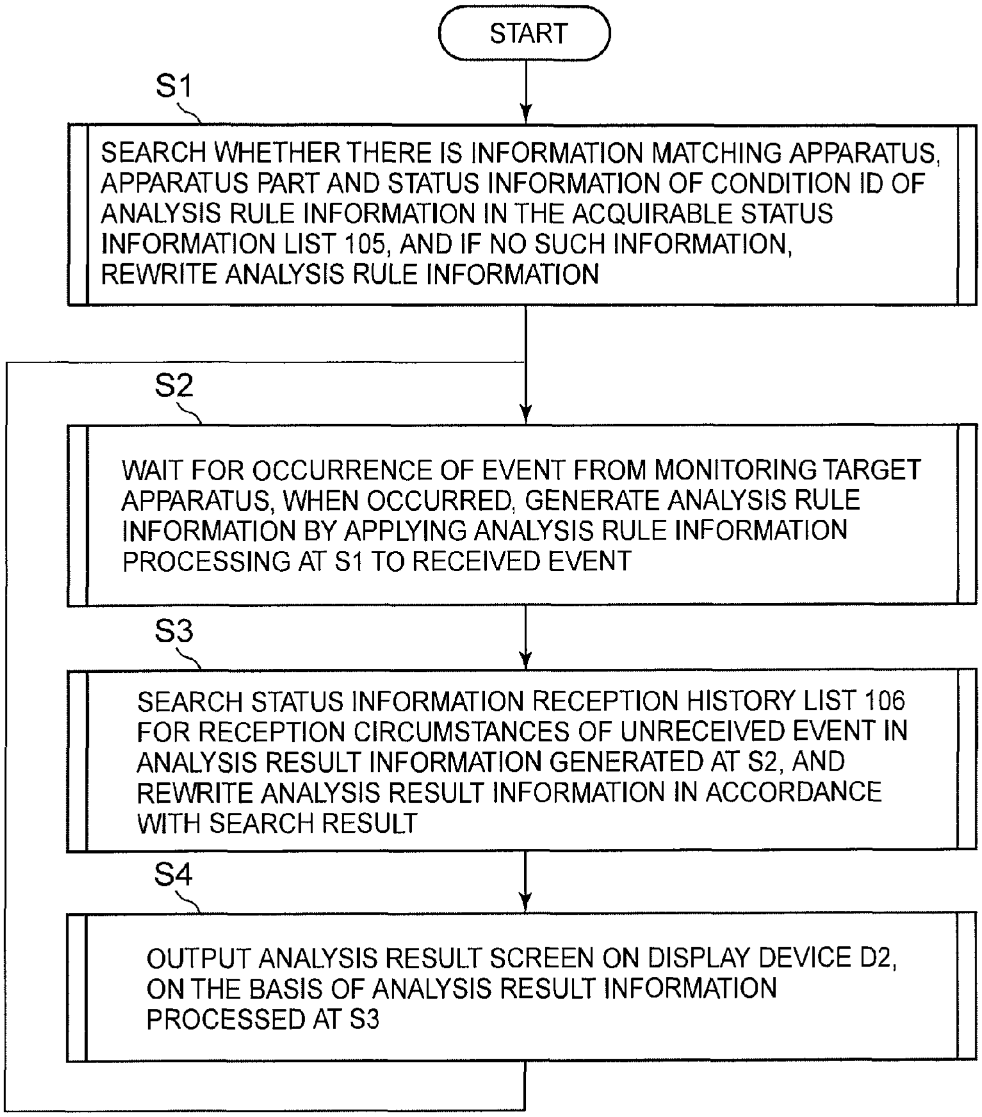
FIG. 17 shows the main flow of a procedure for rewriting an analysis rule using FIG. 13, generating analysis result information by means of the rewritten analysis rule, rewriting the analysis result information using FIG. 14, and displaying an analysis result on a screen on the basis of the rewritten analysis result information.
Figure 18:
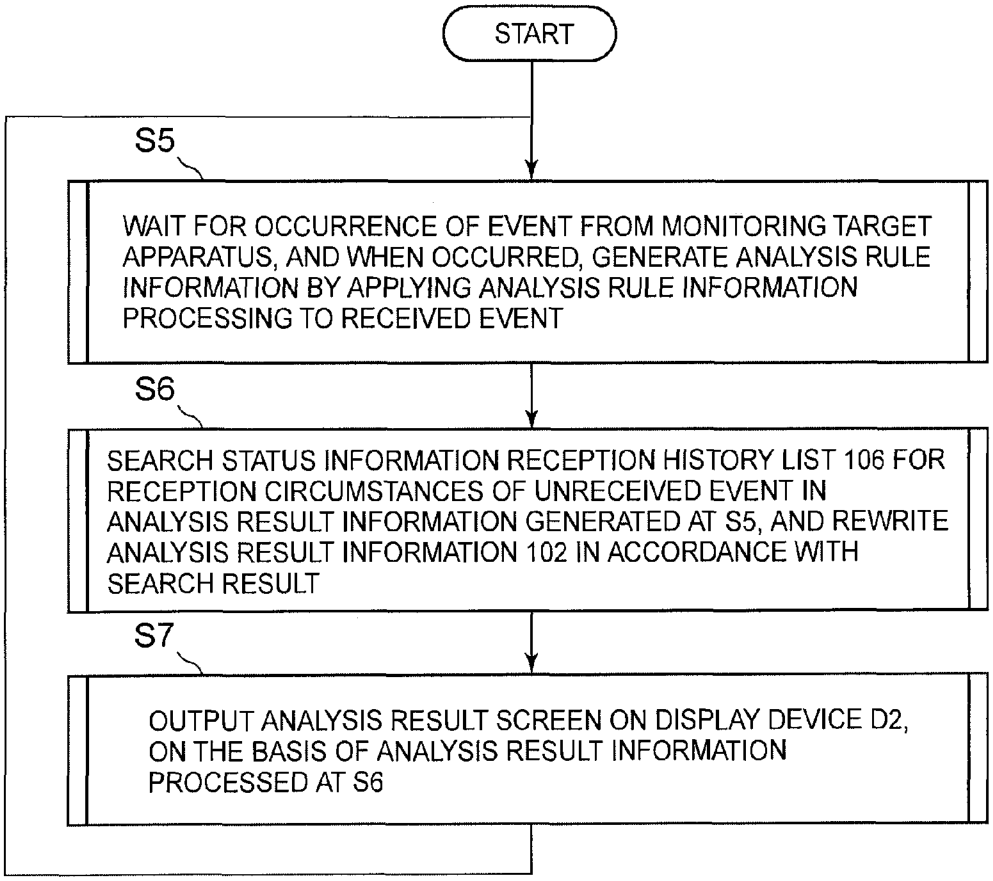
FIG. 18 shows the main flow of a procedure for generating analysis result information by means of an analysis rule, rewriting the analysis result information using FIG. 14, and displaying an analysis result on a screen on the basis of the rewritten analysis result information.

Below, the sequence of the present processing is described with reference to FIG. 17. As regards the timing at which this processing is started up, the step S1 in FIG. 17 is executed in cases where a rewriting process is required in respect of the analysis rule information, for instance, before starting system management, or when there has been a compositional change in the system forming the monitoring target, or the like. The steps S2, S3 and S4 are executed when the management server 1 has received an event from the system which is the monitoring target. Moreover, this processing can be carried out when the acquirable status information list 105 has been updated, and this processing can be repeated in order to reflect the state of the status information reception history list at respective times.

The flow of this processing is described below.

(Step S1) Firstly, the acquirable status information list 105 is searched to find whether it includes information that matches the apparatus/apparatus part/status information of the condition ID in the analysis rule information 102, and if such information is not present in the list, then the analysis rule information is rewritten.

(Step S2) Next, the procedure awaits for the occurrence of an event from a monitoring target apparatus, and when an event has occurred, the analysis result information 103 is generated or updated on the basis of the received event and the analysis rule information processed at step S1.

(Step S3) The management program 104 searches the status information reception history list 106 for the reception circumstances of an unreceived event in the analysis result information generated at S2, and if the unreceived event has not been received ever, then the analysis result information 103 is rewritten so as to set this event as an unreceivable event by attaching a value (in the present example, *2) whereby it can be told that "the unreceived event indicates an event of a type which it has not been possible to receive in the apparatus (or part) in question, or in an apparatus (or part) which is the same product as this apparatus (or part)".

(Step S4) The management program 104 outputs an analysis result screen to the display device D2 on the basis of the analysis result information processed in S3.

The whole of this processing flow is carried out repeatedly from step S2 to step S4 until the system management is halted.

Step S1 may be omitted. In this case, as additional processing to step S3, the analysis result information 103 can be rewritten in such a manner that the event of the type which cannot be acquired in the acquirable status information list is set as an unreceivable event by appending a value (in the present example, *1) whereby "it can be told that the event is of a type which is never received due to product specifications".

The foregoing was a summary of the overall processing flow.

The present example includes a case immediately after system management has been executed. In this case, the reception history only contains the very first event received at step S2. Therefore, sufficient usable history information has not been accumulated in the status information reception history list 106 and the rewriting of the analysis result information using the history information is not effective: consequently, step S3 may be omitted immediately after the start of system management. The decision of when to omit step S3 and when not to omit step S3 may be made on the basis of a condition based on the number of events received so far, or the time, or the condition of receiving an instruction from the administrator of the management system. The reception condition may of course also be related to the number of events.

Figure 19:
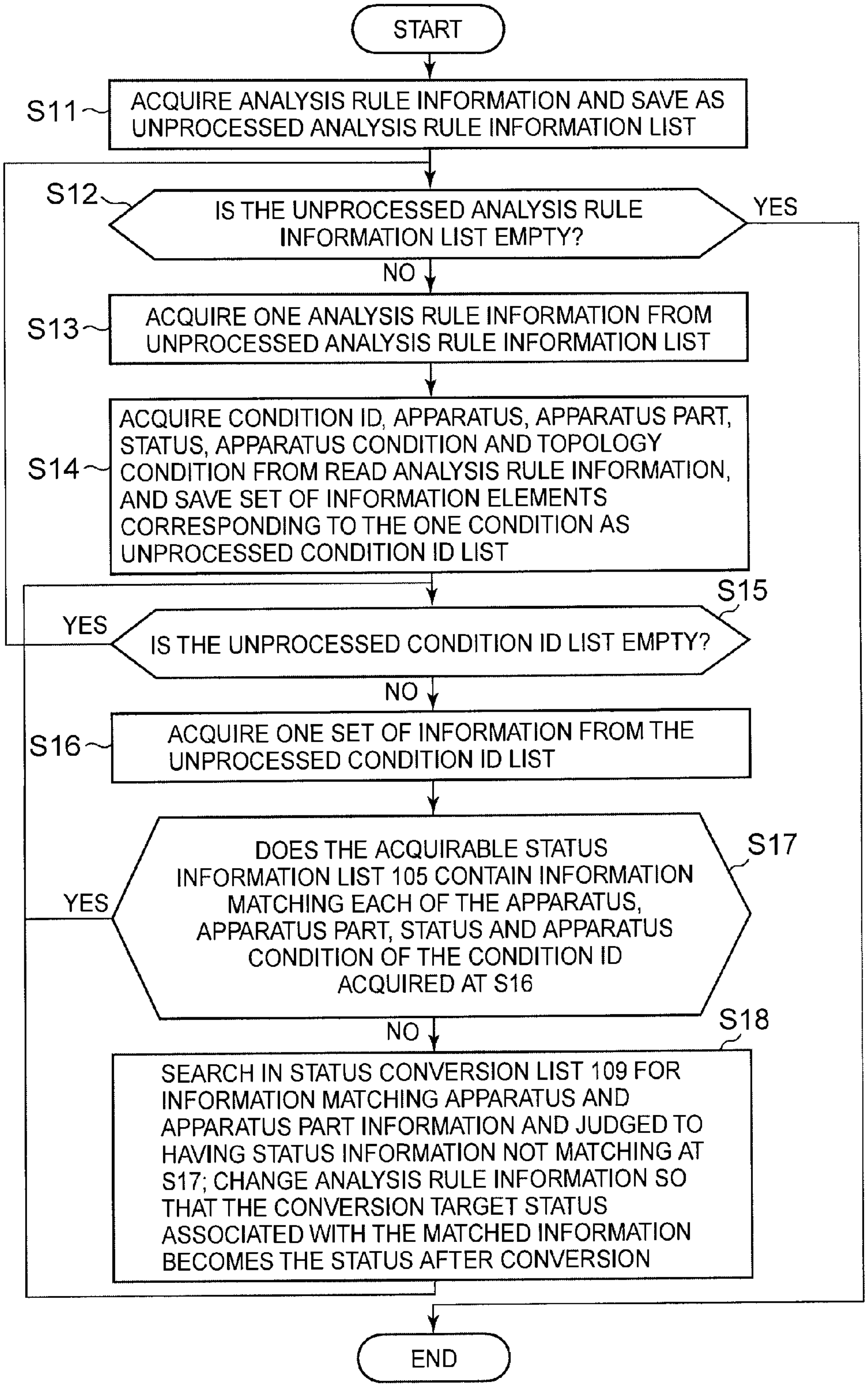
FIG. 19 shows a flow of rewriting an analysis rule using FIG. 13.

Next, the detailed processing in the rewriting processing step S1 of the analysis rule information 102 using the acquirable status information list 105 is described with reference to FIG. 19.

(Step S11) Here, firstly, the analysis rule information 102 is acquired and saved as an unprocessed analysis rule information list. The unprocessed analysis rule information list is temporary data which is used temporarily in the program.

(Step S12) The management program 104 judges whether or not the unprocessed analysis rule information list is empty, and proceeds to step S13 if the list is not empty, or terminates processing if the list is empty.

(Step S13) The management program 104 acquires one analysis rule information from the unprocessed analysis rule information list.

(Step S14) The management program 104 acquires the condition ID, apparatus type, apparatus part type, status and apparatus type and topology conditions, from the analysis rule information acquired at step S13, and stores the respective information corresponding to this one condition in one set as an unprocessed condition ID list. The unprocessed condition ID list is temporary data which is used temporarily in the program.

(Step S15) The management program 104 judges whether or not the unprocessed condition ID list is empty, and proceeds to step S16 if the list is not empty, or returns to step S12 if the list is empty.

(Step S16) The management program 104 acquires one set of information from the unprocessed condition ID list.

(Step S17) The management program 104 searches and determines whether there exists in the acquirable status information list 105 information which matches each one of the apparatus type, the apparatus part type, the status and the apparatus condition (information set) of the condition ID acquired at step S16, and proceeds to step S18 is such information does not exist, and returns to step S15 if such information does exist.

(Step S18) The management program 104 searches the apparatus type C17 and the apparatus part type C18 in the status conversion list 109 to find information which matches the apparatus and apparatus part that did not have a matching status in the judgment in step S17, and rewrites the analysis rule information so that the status indicated by the conversion target status C19 of the matching information thus found becomes a converted status C20.

In step S18, furthermore, the conditions of the analysis rule information are rewritten on the basis of the acquirable status information list 105 and the status conversion list. The concrete processing is as described below.

(A) Cases where the combination of the apparatus type C2, apparatus part type C3, status C4 and apparatus condition 102-22 in the condition exists in the apparatus type C5, apparatus part type C6, status C7 and apparatus condition C8 of the acquirable status information list. In this case, an event which satisfies the corresponding conditions is judged to be receivable.

(B) Cases where the combination of the apparatus type C2, apparatus part type C3, status C4 and apparatus condition 102-22 in the condition does not exist in the apparatus type C5, apparatus part type C6, status C7 and apparatus condition C8 of the acquirable status information list, and furthermore, the combination of the apparatus type C2, apparatus part type C3, status C4 in the condition does exist in the apparatus type C17, apparatus part type C18 and conversion target status C19 of the status conversion list 108. In this case, it is judged that the status indicated by the condition is unreceivable and the symbol "*1" is appended to the status of the corresponding condition.

(C) Cases where the combination of the apparatus type C2, apparatus part type C3, status C4 and apparatus condition 102-22 in the condition does not exist in the apparatus type C5, apparatus part type C6, status C7 and apparatus condition C8 of the acquirable status information list, and furthermore, the combination of the apparatus type C2, apparatus part type C3, status C4 in the condition does not exist in the apparatus type C17, apparatus part type C18 and conversion target status C19 of the status conversion list 108. In this case, it is determined that a judgment cannot be reached on whether or not the status indicated by the condition is receivable, and the symbol "*2" is appended to the status of the corresponding condition. If it is confirmed at a later stage by the processing shown in FIG. 21 that a status indicated by a condition appended with the symbol "*2" has not yet been received, from the status information reception history list, then the event corresponding to this status is treated as an unreceivable event.

Here, a case is described where the analysis rule information 102-R1 in FIG. 3 has been acquired at step S13. The following information elements included in the condition set R1-21 in the analysis rule information 102-R1 are acquired as a set, and saved as an unprocessed ID list.

The condition ID R1C11 "R1-211" comprising the apparatus part type R1C21 "Storage", apparatus part type R1C31 "FcPort", and the status R1C41 "LinkDown".

The condition ID R1C12 "R1-221" comprising the apparatus part type R1C22 "FcSwitch", the apparatus part type R1C32 "FcPort", and the status R1C42 "LinkDown".

Apparatus condition R1-22 "-".

Topology condition R1-23 "StorageFcPort and FcSwitchPort are adjacent ports".

When it is judged whether there exists in the acquirable status information list 105 in FIG. 17 information which matches all of the apparatus type, the apparatus part type, the status and the apparatus and topology conditions acquired in step S14 and step S16, then although the apparatus type R1C21 "Storage" is matched in the apparatus type C5 and the apparatus part type R1C31 "FcPort" is matched in the apparatus part type C6, the status R1C41 "LinkDown" is not matched in the status C7, and hence it is determined that matching information does not exist in the acquirable status information list 105.

When the apparatus type C17 and the apparatus part type C18 of the status conversion list 109 are searched to find information matching the apparatus type R1C21 "Storage" and the apparatus part type R1C31 "FcPort" of the status R1C41 "LinkDown" that was judged to be not matching at step S17, matching information is found, and the unconverted status "LinkDown" and the converted status "Error" which are associated with the matched apparatus type C17 "Storage" and apparatus part type C18 "FcPort" are acquired, rule conversion processing is executed, and the analysis rule information is rewritten accordingly. The analysis rule information 102-R1 after rewriting becomes the analysis rule information 102-R11, and the status R1C41 "LinkDown" that was judged to be not matching is rewritten as the status R11C41 "Error" in the analysis rule information 102-R11, as a result of the conversion process.

Furthermore, when rewriting of the analysis rule information 102-R3 is carried out, the following information which is contained in the condition set R3-21 of the analysis rule information 102-R3 is acquired: the condition ID R3C11 "R3-211" comprising the apparatus type R3C21 "Server", the apparatus part type R3C31 "NetworkClient" and the status R3C41 "Error", the condition ID R3C12 "R3-221" comprising the apparatus type R3C22 "Server", the apparatus part type R3C32 "LANPort" and the status R3C42 "Error", the apparatus condition R3-22 "-", and the topology condition R3-23 "Server is client machine of FileServer". The set information thus acquired is saved as an unprocessed condition ID list.

When it is judged whether there exists in the acquirable status information list 105 in FIG. 17 information which matches all of the apparatus type, the apparatus part type, the status and the apparatus and topology conditions acquired in step S14 and step S16, then although the apparatus type R3C21 "Server" is matched in the apparatus type C5, the apparatus part type R3C31 "NetworkClient" is matched in the apparatus part type C6, and the status R3C41 "Error" is matched in the status C7, the apparatus condition R3-22 "-" in not matched in the apparatus condition C8, and hence it is determined that matching information does not exist in the acquirable status information list 105.

When the apparatus type C17 and the apparatus part type C18 of the status conversion list 109 are searched to find information matching the apparatus type R3C21 "Server" and the apparatus part type R3C31 "NetworkClient" of the apparatus condition R3-22 "-" that was judged to be not matching at step S17, matching information is found, and the conversion target status and the converted status which are associated with the matched apparatus C17 "Server" and apparatus part C18 "NetworkClient" are acquired, rule conversion processing is executed, and the analysis rule information is rewritten accordingly. By means of this rewriting, the analysis rule information 102-R-31 and 103-R32 are generated from the analysis rule information 102-R3. The apparatus condition R3-22 "-"which was judged to be not matching is rewritten as the apparatus condition "Server OS is 'XXX'" in the analysis rule information 102-R31 and is rewritten as the apparatus condition "Server OS is other than 'XXX'" in the analysis rule information 102-R32.

By means of the procedure described above, rewriting of the analysis rule information 102 using the acquirable status information list 105 is completed.

Figure 20:
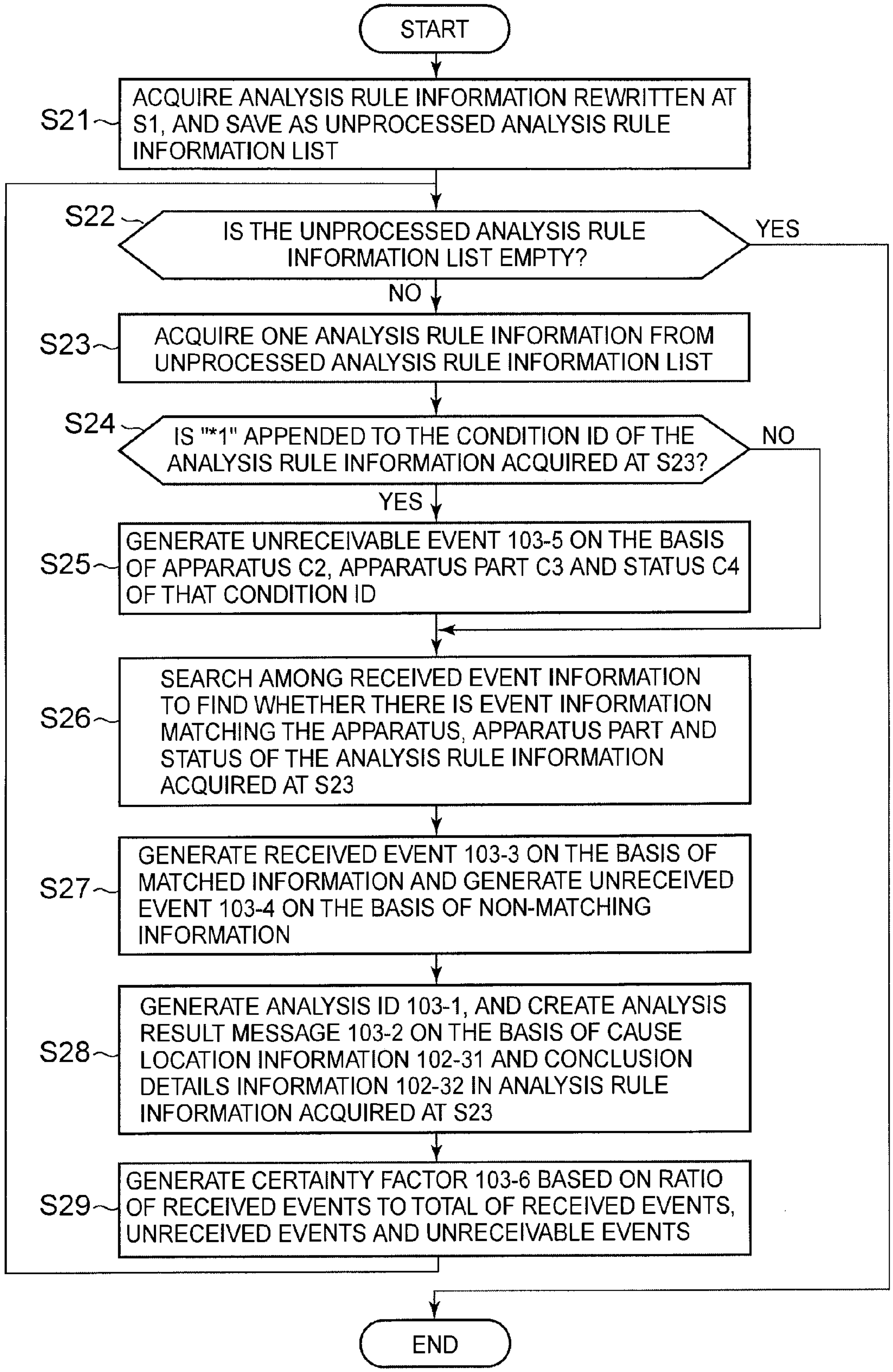
FIG. 20 shows a flow of generating analysis result information on the basis of an analysis rule and an event received from a monitoring target apparatus.

Next, the detailed processing of the procedural step S2 which generates analysis result information on the basis of received events and the analysis rule information 102 will be described with reference to FIG. 20.

(Step S21) Firstly, the analysis rule information rewritten at step S1 is acquired and saved as an unprocessed analysis rule information list. The unprocessed analysis rule information list is temporary data which is used temporarily in the program. (Step S22) Thereupon, it is judged whether or not the unprocessed analysis rule information list is empty, and the program advances to step S23 if the list is not empty, or terminates processing if the list is empty.

(Step S23) The management program 104 acquires one analysis rule information from the unprocessed analysis rule information list.

(Step S24) The management program 104 judges whether the symbol "*1" is appended to the condition ID of the analysis rule information acquired at step S23, and if this symbol is appended, the program advances to step S25, whereas if this symbol is not appended, then the program advances to step S26.

(Step S25) The management program 104 acquires the apparatus type, apparatus part type and status of the condition ID judged to have "*1" appended at step S24, from the analysis rule information acquired at step S23, and generates an unreceivable event 103-5 on the basis of the acquired information. When generating the analysis result information, the information about the apparatus type, apparatus part type and status relating to a condition ID to which "*1" is appended is processed so as to generate an unreceivable event. The method of appending a symbol may adopt any method (in terms of the location or the appended text string, etc.), provided that it enables the management server to identify in respect of which event (condition) the symbol is appended.

(Step S26) The management program 104 searches the received event information to find out whether there is information matching the apparatus type, apparatus part type and status of the analysis rule information which was acquired at S23.

(Step S27) The management program 104 generates a received event 103-3 on the basis of apparatus type, apparatus part type and status information that has been matched, and generates an unreceived event 103-4 on the basis of apparatus type, apparatus part type and status information that does not match.

(Step S28) The management program 104 generates an analysis ID 103-1 which uniquely identifies the analysis result information, and generates an analysis result message 103-2 on the basis of the cause location information 102-31 and the conclusion details information 102-32 in the analysis rule information acquired at S23.

(Step S29) The management program 104 generates a certainty factor 103-6 from the ratio of the number of received events to the number of received events, unreceived events and unreceivable events generated in step S25 and step S27.

It is supposed that the certainty factor is calculated as the value of the number of received events divided by the sum of the number of the received events, the number of unreceived events and the number of unreceivable events, but another calculation method may be employed.

The description here refers to the analysis rule information 102-R1 in FIG. 3 and the analysis result information 103-A1 in FIG. 10, by way of example. For instance, it is supposed that only an event meaning "the state of the FC port of the FC switch (identifier FcSw01) has changed to LinkDown" has been received and the analysis rule information 102-R1 in FIG. 3 has been acquired at step S23. Firstly, in step S24, it is judged whether the symbol "*1" is appended to the condition IDs R1C11 "R1-211" and R1C12 "R1-221" in the analysis rule information 102-R1, and if the result is that it is not appended, than an unreceivable event is not generated. Next, in step S26 and step S27, the condition set R1-21 of the analysis rule information 102-R1 is searched by referring to the management target composition information 101, to find a condition which matches the information relating to the apparatus, apparatus part and status indicated in the event that has actually been received, and since the apparatus type R1C22 "FcSwitch", the apparatus part type R1C32 "FcPort" and the status R1C42 "LinkDown" are matching, then a received event A1-3 is generated on the basis of the matched information (in FIG. 10, by way of example, this is indicated in a format where the apparatus, apparatus type and status are linked by hyphens).

Moreover, since there is no event which matches the apparatus type R1C21 "Storage", the apparatus part type R1C31 "FcPort" and the status R1C41 "LinkDown", then an unreceived event A1-4 is generated on the basis of the information that was not matched. Next, in step S28, the analysis ID A1-1 "A01" which uniquely identifies the analysis result information is generated, and an analysis result message A1-2 is generated on the basis of the cause location information R1-31 and the conclusion details information R1-32 included in the conclusion part R1-3 of the analysis rule information 102-R1 and the identifier of the apparatus which is included in the received event. Finally, at step S29, since there is one received event whereas the number of received events and unreceived events generated is two, then the received event ratio is 1/2, and therefore the certainty factor A1-6 is generated as "50".

As shown in FIG. 10, when the condition of the analysis rule information is applied to an actual apparatus while referring to the management target composition information 101, a notational format including the identifiers of the obtained apparatus and part is created and stored for the unreceived event. However, as a further method of representing an unreceived event, it is possible to employ a format of a type which does not include the identifiers of the actual apparatus or part. This also applies similarly to the unreceivable events.

Figure 21:
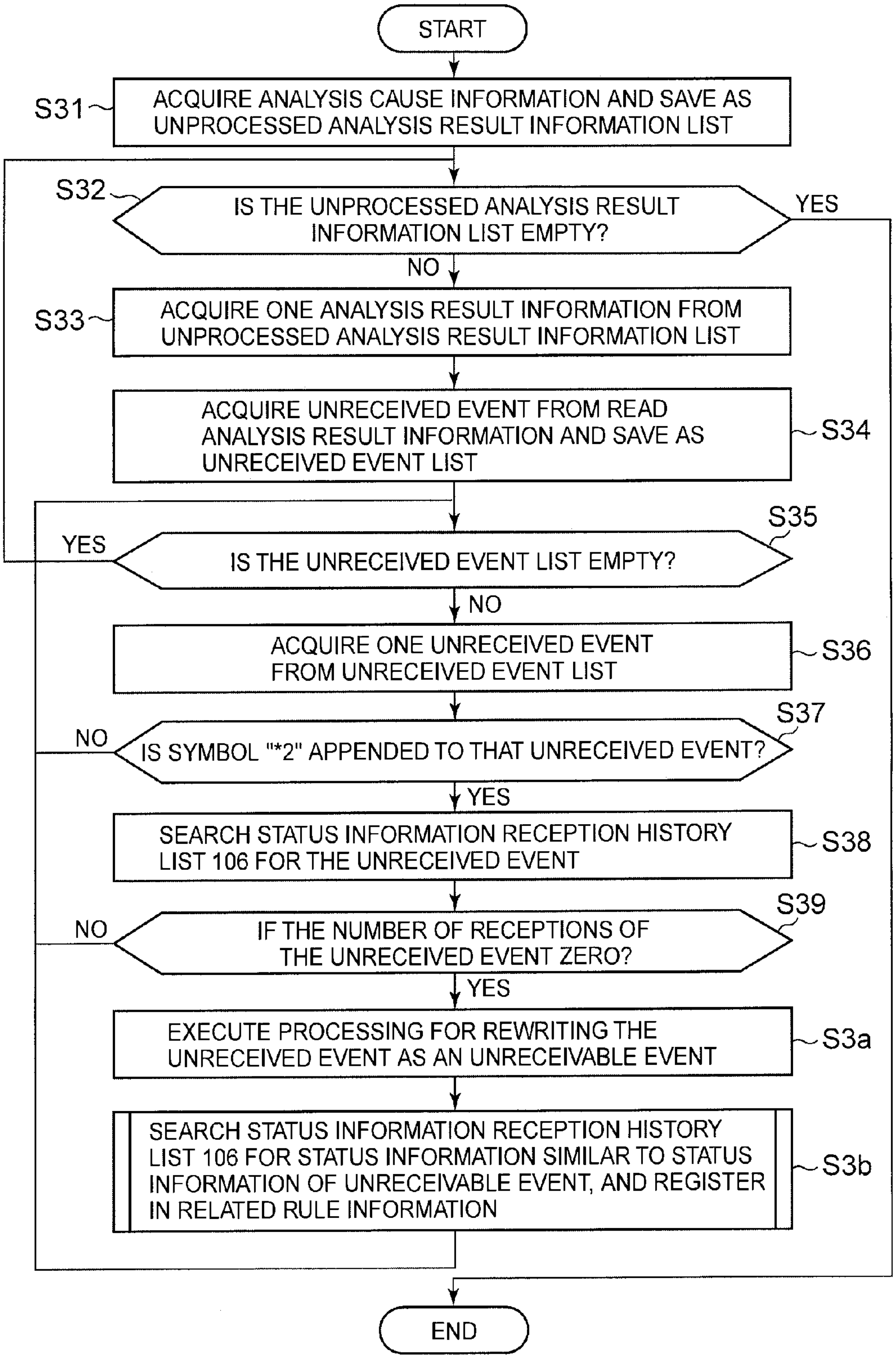
FIG. 21 shows a flow of rewriting analysis result information using FIG. 14.

Next, the detailed processing in the rewriting processing step S3 of the analysis result information 103 using the status information reception history list 106 is described with reference to FIG. 21.

(Step S31) Firstly, the analysis result information 103 is acquired and saved as an unprocessed analysis rule information list. The unprocessed analysis result information list is temporary data which is used temporarily in the program.

(Step S32) Thereupon, it is judged whether or not the unprocessed analysis result information list is empty, and the program advances to step S33 if the list is not empty, or terminates processing if the list is empty.

(Step S33) The management program 104 acquires one set of analysis result information from the unprocessed analysis result information list.

(Step S34) The management program 104 acquires unreceived events from the analysis result information acquired at step S33 and saves these as an unprocessed event list. The unprocessed event list is temporary data which is used temporarily in the program.

(Step S35) The management program 104 judges whether or not the unreceived event list is empty, and proceeds to step S36 if the list is not empty, or returns to step S32 if the list is empty.

(Step S36) The management program 104 acquires one unreceived event from the unreceived event list.

(Step S37) The management program 104 judges whether the symbol "*2" is appended to the unreceived event acquired at step S36, and if this symbol is appended, the program advances to step S38, whereas if this symbol is not appended, then the program advances to step S35.

(Step S38) The management program 104 acquires information corresponding to the apparatus, apparatus part, status and condition ID from the unreceived event acquired at step S36 (for example, in the case of the unreceived event A1-4 "Storage-FcPort-LinkDown/R1-211 *2" in the analysis rule information 103-A1 in FIG. 10, "Storage" is acquired as the information corresponding to the apparatus, "FcPort" is acquired as information corresponding to the apparatus part, "LinkDown" is acquired as information corresponding to the status, and "R1-211" is acquired as information corresponding to the condition ID), and the status information reception history list 106 is searched to find information which matches the acquired information.

(Step S39) The management program 104 acquires the number of times that matching information based on the search in step S38 has been received, judges whether or not the number of receptions is "0", and proceeds to step S3*a* if it is "0" and returns to step S35 if it is not "0".

(Step S3*a*) The management program 104 rewrites an unreceived event judged to have a number of receptions of "0" at step S37, as an unreceivable event, and erases the unreceived event.

For example, if the unreceived event "Storage-FcPort-LinkDown/R1-211 *2" in the analysis result information 103-1 is acquired at step S36, then "*2" is appended. If the event to which this symbol has been appended was an unreceived event, then processing is carried out to search for the reception circumstances of the status information by using the status information reception history list 106. Similarly to "*1", the method of appending a symbol may adopt any method (in terms of the location or the appended text string, etc.), provided that it enables the management server to identify in respect of which event (condition) the symbol is appended. In step S38, from the unreceived event "Storage-FcPort-LinkDown/R1-**211*2", "Storage" is acquired as information corresponding to the apparatus, "FcPort" is acquired as information corresponding to the apparatus part, "LinkDown" is acquired as information corresponding to the status and "R1-211" is acquired as information corresponding to the condition ID, and when information which matches this acquired information is searched for in the status information reception history list 106 in FIG. 14, the matching information having a condition ID C10 "R1-211", apparatus C11 "Storage", apparatus part C12 "FcPort" and status C13 "LinkDown" is found. From the number of receptions C14** "0" in the matched information, the number of receptions is zero, and therefore a processing flow is adopted whereby the unreceived event "Storage-FcPort-LinkDown" is rewritten as an unreceivable event at step S3*a*, and "Storage-FcPort-LinkDown" is erased as an unreceived event.

(Step S3*b*) The management program 104 searches the status information reception history list 106 to find status information similar to the status information of an unreceived event (unreceivable event), and registers this information in the related rule information 107.

By means of the procedure described above, rewriting of the analysis result information 103 using the status information reception history list 106 is completed. Upon reception of an event, the contents of the status information reception history list are altered, and may change to a state where a status that had not been received previously has been received. In this case, by repeating the present processing, it is possible to remove an event which had been included in the unreceivable events of the analysis result information 103 by appending the symbol "*2".

Figure 22:
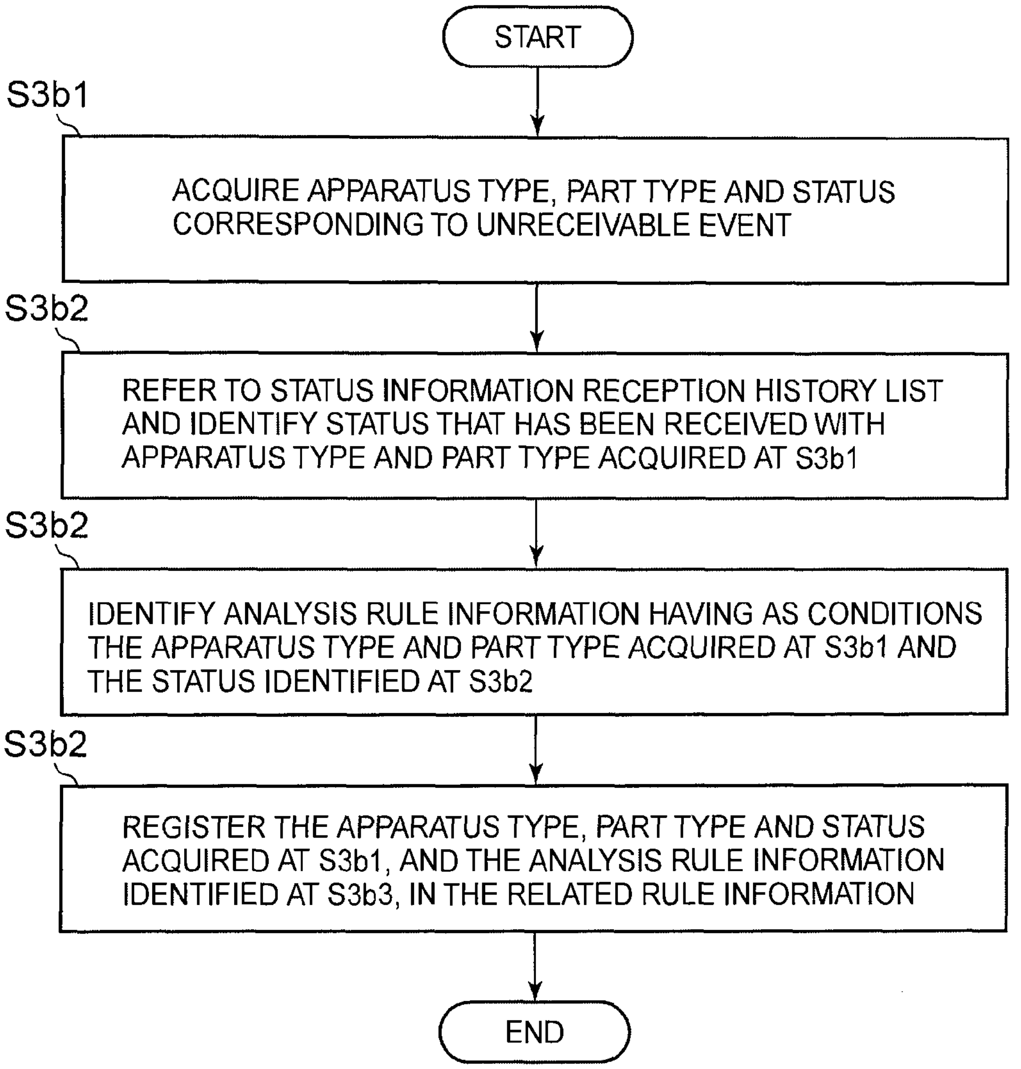
FIG. 22 shows a flow of registering, in FIG. 15, an analysis rule including status information that is similar to status information judged to be not acquirable in the flow in FIG. 21.

Next, the details of the registration process of the related rule information 107 in step S3*b* will be described with reference to FIG. 22.

(Step S3*b*1) The management program 104 acquires the apparatus identifier and part identifier of an unreceivable event and acquires the apparatus type and part type by referring to the management target composition information 101.

(Step S3*b*2) The management program 104 searches the status information reception history list 106 and identifies a status that has been received as an event one or more times and which matches the apparatus type and part type acquired at step S3*b*1.

(Step S3*b*3) The management program 104 identifies analysis rule information having, as a condition, a status acquired at step S3B2 which has been received previously and which matches the apparatus type and part type acquired at step S3*b*1.

(Step S3*b*4) The management program 104 registers a set comprising the apparatus type, part type and status identified at step S3*b*1, and the identifier of the analysis rule information acquired at step S3*b*2, as related rule information 107.

The case of the analysis result information 103-1 is given by way of example. The unreceived event A1-4 "Stg01-p01-LinkDown/R1-211 *2" in the analysis result information 103-1 is rewritten as an unreceivable event by the processing flow in FIG. 21, thereby generating the analysis result information 103-A2 shown in FIG. 11. Next, by step S3*b*1, the apparatus type "Storage" and the apparatus part type "FcPort" are acquired from the unreceivable event A2-5 (in other words, the received event A1-4). At step S3*b*2, the status information reception history list 106 is searched to find information having apparatus type C11 "Storage" and apparatus part type C12 "FcPort" and matching the status "Error" which is a status that has been received one or more times. At step S3*b*3, the analysis rule information 102-R2 which has rule ID "R2" is identified as analysis rule information. "R2" is registered as a related rule ID corresponding to the unreceivable event type having the apparatus type C11 "Storage", the apparatus part type C12 "FcPort" and the status "LinkDown".

By means of the procedure above, the related rule information 107 is registered.

Figure 23:
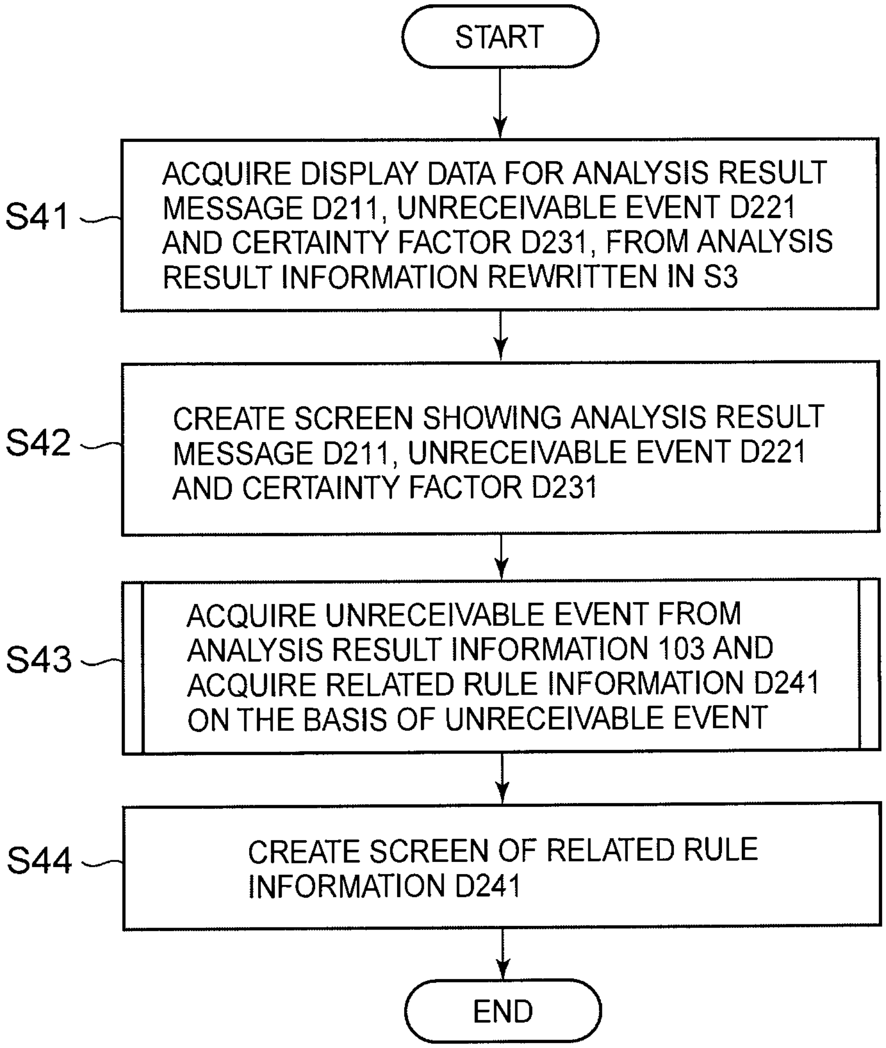
FIG. 23 shows a flow for displaying an analysis result on a screen on the basis of analysis result information which has been rewritten on the basis of the flow in FIG. 21.

Next, the details of the processing in the analysis result screen display procedure step S4 are described with reference to FIG. 23.

(Step S41) The management program 104 acquires display data, namely, the analysis result message D211 from the analysis result message 103-2 of the analysis result information rewritten at step S3, the unreceivable event D221 from the unreceivable event 103-5, and the certainty factor D231 from the certainty factor 103-6.

(Step S42) The management program 104 creates a screen comprising the analysis result message D211, the unreceivable event D221 and the certainty factor D231, on the basis of the respective display data acquired at step S41.

(Step S43) The management program 104 acquires display data for the related rule information D241 on the basis of the unreceivable event 103-5 acquired from the analysis result information at step S41.

(Step S44) The management program 104 creates a screen of the related rule information D241 on the basis of the display data acquired at step S43.

Figure 26:
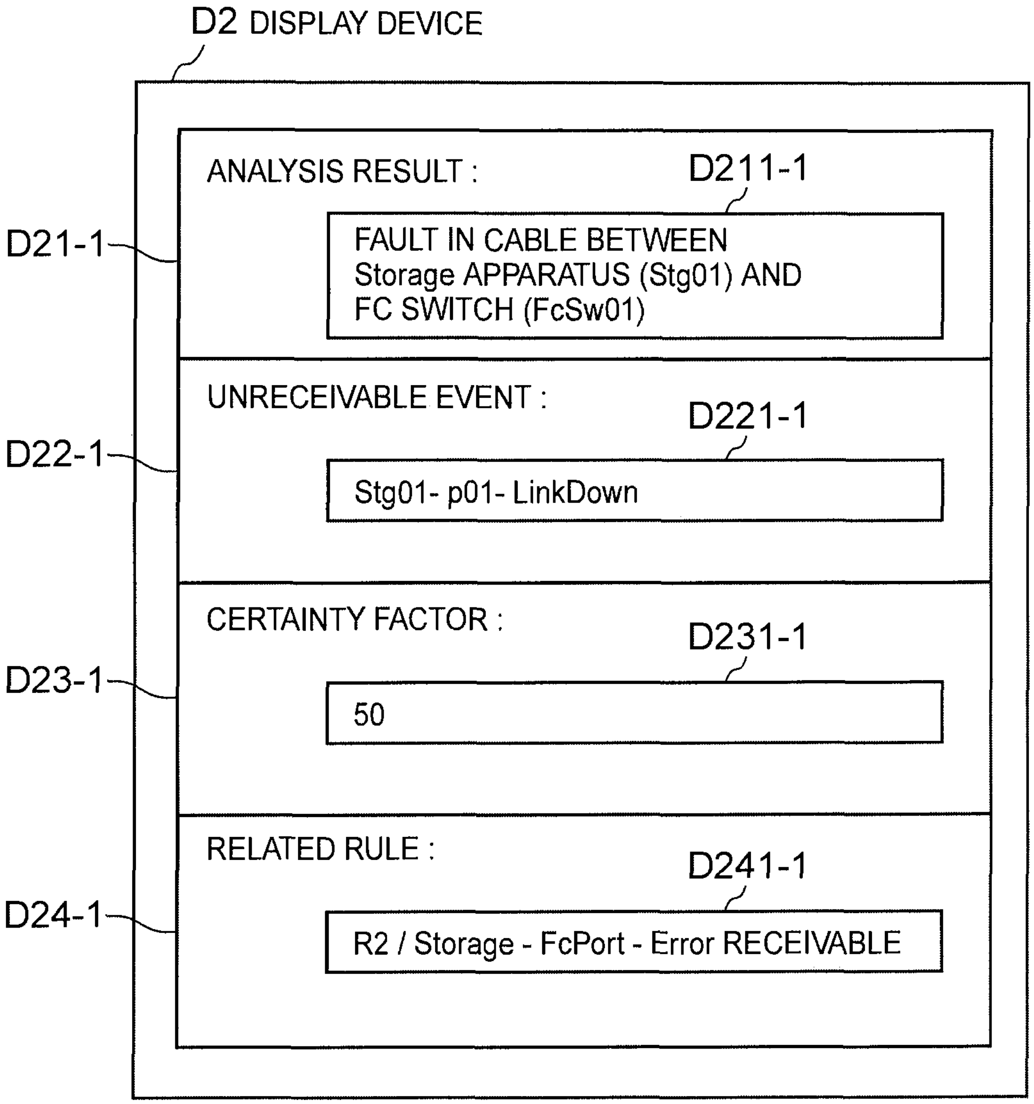
FIG. 26 shows one example of screen display data of an analysis result based on the information relating to an analysis result in FIG. 11.

Processing for generating the analysis result screen display data in FIG. 26 on the basis of the analysis result information 103-A2 in FIG. 11 is described by way of example. Firstly, at step S41, display data for the analysis result message A2-2 "Fault in cable between Storage apparatus (Stg01) and FC switch (FcSw01)", the unreceivable event A2-5 "Stg01-*p*01-LinkDown/R1-211*2", and the certainty factor D2-6 "50" is acquired from the analysis result information 103-A2. Thereupon, at step S42, a display comprising the analysis result message D211-1 "Fault in cable between Storage apparatus (Stg01) and FC switch (FcSw01)", the unreceivable event D221-1 "Storage-FcPort-LinkDown", and the certainty factor D231-1 "50" in FIG. 26 is created on the basis of the respective display data acquired at step S41. Furthermore, at step S43, the related rule ID "R2" is acquired as a related rule for "Stg01-p01-LinkDown", by using the unreceivable event A2-5 "Stg01-p01-LinkDown/R1-211 *2" acquired at step S41 and the related rule information 107 in FIG. 15. On the basis of the acquired related rule ID "R2", at step S44, a display containing the related rule information D241-1 "R2/Storage-FcPort-Error receivable" is created. The analysis result message D211-1, the unreceivable event D221-1, the certainty factor D231-1 and the related rule information D241-1 depicted in FIG. 26 are examples, and another display method may be adopted provided that the method enables a user to recognize accurately the underlying meaning of the analysis result information. Moreover, it is also possible to display the analysis rule information of the related rule in this display.

The symbols "*1" and "*2" displayed for an unreceivable event may be substituted with another display that enables an administrator to distinguish an event of a type that cannot be obtained due to the product specifications and an event of a type that has never been received in an apparatus (or part) which is the same product.

By means of the procedure described above, if status information which cannot be acquired is included in the analysis rule information, by using rewritten analysis result information, it is possible to obtain a screen which indicates the fact that the analysis result is based on analysis rule information including status information that cannot be acquired. More specifically, by being able to distinguish, even in the case of unreceivable events, that an event is of a type that cannot be obtained due to the product specifications, or of a type that has never been received in an apparatus (or part) which is the same product, an administrator can be assisted in judging whether or not to wait for an improvement in the certainty factor through the reception of further events.

Figure 24:
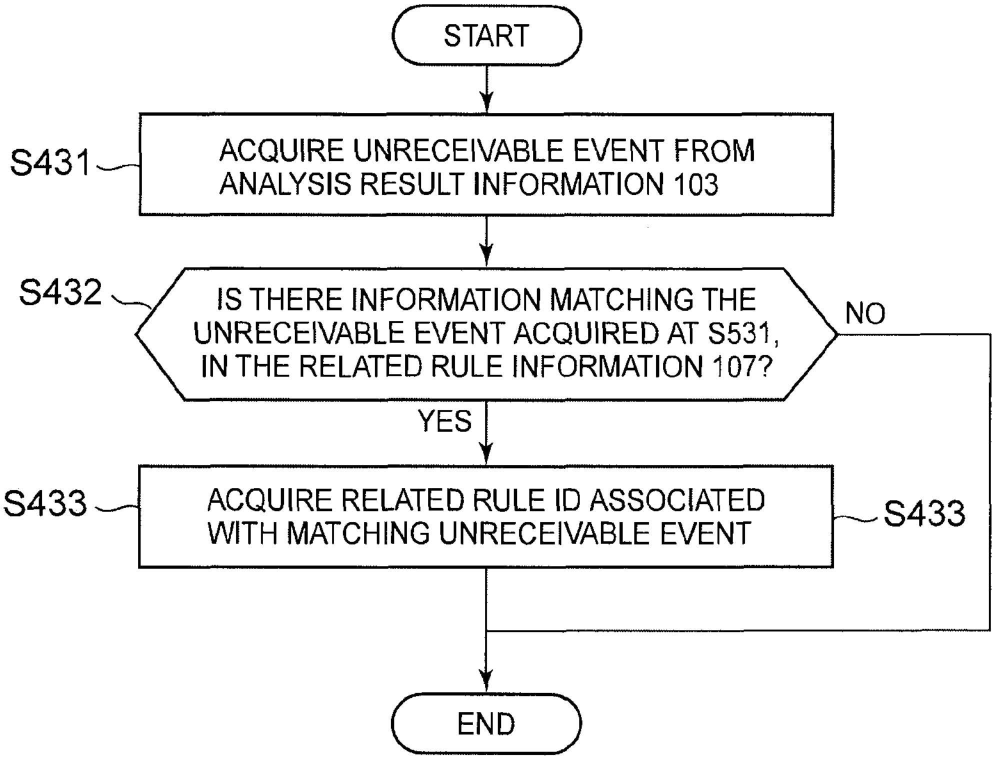
FIG. 24 shows a flow for acquiring information registered in FIG. 22.
Figure 25:
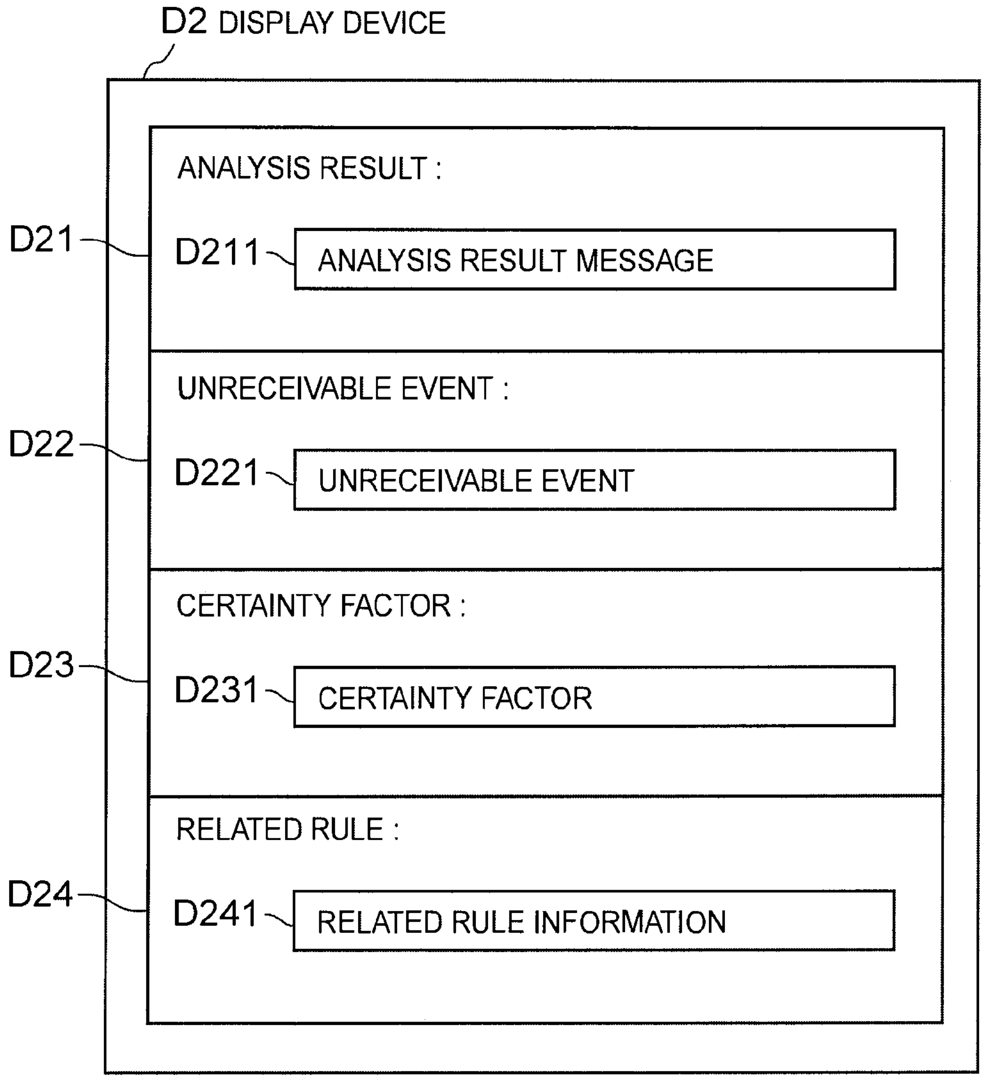
FIG. 25 shows an example of screen display data of an analysis result.

Next, the details of the processing in the related rule information acquisition procedure step S43 are described with reference to FIG. 24.

(Step S431) The management program 104 acquires an unreceivable event from the analysis result information generated at step S3.

(Step S432) The management program 104 searches and determines whether information matching the unreceivable event acquired at step S431 is present in the unreceivable events C15 of the related rule information 107, and advances to step S433 if such information is present, and terminates processing if such information is not present.

(Step S433) The management program 104 acquires the related rule ID C16 associated with the unreceivable event C15 searched for at step S432, and sets display data for the related rule information D241.

By means of the procedure described above, it is possible to acquire a rule ID of analysis rule information having as a condition an event which is related to an event that cannot be received.

If the processing for changing the analysis rule information based on the acquirable status information in FIG. 17 means that the condition part becomes the same as that of another analysis rule information, then the conclusion part of the conversion target analysis rule information can be unified with the other analysis rule information.

If the state of an apparatus (or part) which is indicated by the status after conversion includes a state other than the state taken by the conversion target status on which the common model is premised, then the certainty factor value from before conversion is employed, and if the state of the apparatus (or part) indicated by the status after conversion includes a portion of a state taken by the conversion target status on which the common model is premised, then processing for reducing the certainty factor can be carried out.

<4. Modification of Processing of Management Server and Display>

Below, a modification of the management program 104 in the management server 1 will be described.

The following description covers the general procedure from the management server 1 reading analysis rule information 102 on the memory, confirming the past reception circumstances of unreceived event information (status information) in analysis result information 103 generated on the basis of the read analysis rule information, and carrying out processing for rewriting the analysis result information in accordance with the results, until displaying an analysis result on a screen on the basis of the rewritten analysis result information. This procedure is carried out when generating analysis result information, but it is possible, for example, for this procedure to be executed as desired on the basis of an operation by a user, or to be executed automatically at periodic intervals by the management program 104, and so on. The flow of this processing is described below.

(Step S5) The management program 104 generates analysis result information 103 by applying the analysis rule information 102 to an event that has been received from a monitoring target apparatus.

(Step S6) The management program 104 searches the status information reception history list 106 for the reception circumstances of an unreceived event in the analysis result information 103 generated at S5, and rewrites the analysis result information in accordance with the search result.

The details of the processing in this step are the same as the rewriting procedure (FIG. 21) of the analysis result information 103 using the status information reception history list 106 in Example 1.

(Step S7) The management program 104 outputs an analysis result screen to the display device D2 on the basis of the analysis result information processed in S6. The details of this step are the same as the analysis result screen display procedure (FIG. 23) in Example 1.

By means of the procedure described above, the analysis result information 103 generated on the basis of the analysis rule information 102 is rewritten using the status information reception history information 106, and an analysis result can be displayed on a screen on the basis of the rewritten analysis result information.

According to the foregoing description, the management system which manages information processing apparatuses according to the present invention comprises:

a network interface which receives management information from the information processing apparatuses;

a processor which judges a status of each information processing apparatus on the basis of the management information;

a memory which stores a status of the information processing apparatus, analysis rule information for identifying a cause apparatus which is the cause of the occurrence of the status, and acquirable status information which indicates a status that is not detectable due to the specifications of the information processing apparatus; and a display device which displays the status of the information processing apparatus, Moreover, according to this description, (A) the memory stores a plurality of analysis result information generated on the basis of the analysis rule information, each including cause information indicating the cause in the cause apparatus, one or more status conditions relating to the information processing apparatus for identifying the cause apparatus with sufficient conditions, a certainty factor representing the degree of certainty of the cause information, and one or more detected status which satisfies all or a portion of the one or more status conditions, (B) the processor identifies a status which cannot be detected due to the specifications of the information processing apparatus and which is included in the one or more status conditions that are not satisfied by the detected status, on the basis of the acquirable status information, and (C) the processor causes the display device to display the detected status, the cause information, the certainty factor, and the status which cannot be detected due to the specifications of the information processing apparatus, on the basis of the analysis result information.

Furthermore, (D) the memory stores status reception history information including statuses which have been detected from information processing apparatuses, for each product line, (E) the processor identifies, on the basis of the status reception history information, a status of a prescribed information processing apparatus which is included in the one or more status conditions that are not satisfied by the detected status and which has not been detected in the past from information processing apparatuses which are of the same product line as the prescribed information processing apparatus, and (F) the processor may cause the display device to display the status which has not been detected in the past.

Moreover, according to the foregoing description, the status reception history information may include a status detected from information processing apparatuses having the same product model number, as a status detected from the information processing apparatuses of each product line.

Furthermore, according to the description, the status reception history information may include a status detected from information processing apparatuses having the same predetermined portion of the product model number, as a status detected from the information processing apparatuses of each product line.

Furthermore, according to the description, the analysis rule information is information assuming a status determined in a common model, the memory stores status conversion information including the status determined in the common model and a particular status that is a substitute for this status, and the processor may update the analysis rule information on the basis of the status conversion information so as to conform with the specifications particular to the information processing apparatus.

Moreover, the particular status may mean either the same as or including an apparatus state indicated by the status determined in the common model.

Furthermore, according to the description, (G) the processor identifies analysis rule information which corresponds to a status that cannot be detected due to the specifications of the information processing apparatus and which includes another status detected from the prescribed information processing apparatus and part, and (H) the processor may cause the display device to display the other status or an identifier of analysis rule information including the other status, as a detectable status corresponding to the status that cannot be detected due to the specifications, on the basis of the related rule information.

Moreover, according to the description, (I) the processor identifies analysis rule information which corresponds to a status that has not been detected in the past from information processing apparatuses or parts of the same product line and which includes another status that has been detected from the information processing apparatuses or parts of the same product line, and (J) the processor may cause the display device to display the other status or an identifier of analysis rule information including the other status, as a detectable status corresponding to the status that has not been detected in the past, on the basis of the related rule information.

However, the present application discloses matters other than these.

REFERENCE SIGNS LIST

0 information processing system
1 management server
3 management target machine group
10 memory
11 processor
12 screen output interface

The invention claimed is:

1. A management system which manages information processing apparatuses, comprising:

a network interface receiving management information from the information processing apparatuses;

a processor determining a status of each information processing apparatus based on the management information;

a memory storing the status of the information processing apparatus, analysis rule information for identifying a cause apparatus which is the cause of the occurrence of the status, and acquirable status information which indicates a status that is not detectable due to the specifications of the information processing apparatus; and a display device displaying the status of the information processing apparatus, wherein the memory stores a plurality of analysis result information generated based on the analysis rule information, each including cause information indicating the cause in the cause apparatus, one or more status conditions relating to the information processing apparatus for identifying the cause apparatus with sufficient conditions, a certainty factor representing the degree of certainty of the cause information, and one or more detected status which satisfies all or a portion of the one or more status conditions, wherein the processor identifies a status which cannot be detected due to the specifications of the information processing apparatus and which is included in the one or more status conditions that are not satisfied by the detected status, based on the acquirable status information, and wherein the processor causes the display device to display the detected status, the cause information, the certainty factor, and the status which cannot be detected due to the specifications of the information processing apparatus, based on the analysis result information.

2. A management system according to claim 1, wherein the memory stores status reception history information including statuses which have been detected from information processing apparatuses, for each product line, wherein the processor identifies, based on the status reception history information, a status of a prescribed information processing apparatus which is included in the one or more status conditions that are not satisfied by the detected status and which has not been detected in the past from information processing apparatuses which are of the same product line as the prescribed information processing apparatus, and wherein the processor causes the display device to display the status which has not been detected in the past.

3. A management system according to claim 2, wherein the status reception history information includes a status detected from information processing apparatuses having the same product model number, as a status detected from the information processing apparatuses of each product line.

4. A management system according to claim 2, wherein the status reception history information includes a status detected from information processing apparatuses having the same predetermined portion of the product model number, as a status detected from the information processing apparatuses of each product line.

5. A management system according to claim 4, wherein the analysis rule information is information assuming a status determined in a common model, wherein the memory stores status conversion information including the status determined in the common model and a particular status that is a substitute for this status, and wherein the processor updates the analysis rule information based on the status conversion information so as to conform with the specifications particular to the information processing apparatus.

6. A management system according to claim 5, wherein the particular status means either the same as or including an apparatus state indicated by the status determined in the common model.

7. A management system according to claim 6, wherein the processor identifies analysis rule information which corresponds to a status that cannot be detected due to the specifications of the information processing apparatus and which includes another status detected from the prescribed information processing apparatus and part, and wherein the processor causes the display device to display the other status or an identifier of analysis rule information including the other status, as a detectable status corresponding to the status that cannot be detected due to the specifications, based on related rule information.

8. A management system according to claim 6, wherein the processor identifies analysis rule information which corresponds to a status that has not been detected in the past from information processing apparatuses or parts of the same product line and which includes another status that has been detected from the information processing apparatuses or parts of the same product line, and wherein the processor causes the display device to display the other status or an identifier of analysis rule information including the other status, as a detectable status corresponding to the status that has not been detected in the past, based on related rule information.

* * * * *